United States Patent
Niizuma

(10) Patent No.: US 12,103,411 B2
(45) Date of Patent: Oct. 1, 2024

(54) POWER SUPPLY DEVICE AND POWER SUPPLY SYSTEM

(71) Applicant: IHI Corporation, Tokyo (JP)

(72) Inventor: Motonao Niizuma, Tokyo (JP)

(73) Assignee: IHI Corporation, Tokyo (JP)

( * ) Notice: Subject to any disclaimer, the term of this patent is extended or adjusted under 35 U.S.C. 154(b) by 124 days.

(21) Appl. No.: 18/017,131

(22) PCT Filed: Jul. 13, 2021

(86) PCT No.: PCT/JP2021/026356
§ 371 (c)(1),
(2) Date: Jan. 20, 2023

(87) PCT Pub. No.: WO2022/091491
PCT Pub. Date: May 5, 2022

(65) Prior Publication Data
US 2023/0264581 A1   Aug. 24, 2023

(30) Foreign Application Priority Data

Oct. 29, 2020   (JP) .................................. 2020-181244

(51) Int. Cl.
*B60L 53/126* (2019.01)
*B60L 53/36* (2019.01)
(Continued)

(52) U.S. Cl.
CPC ............. *B60L 53/126* (2019.02); *B60L 53/36* (2019.02); *B60L 53/38* (2019.02); *H02J 50/12* (2016.02)

(58) Field of Classification Search
CPC ........ B60L 53/126; B60L 53/36; B60L 53/38; H02J 50/10; H02J 50/12; H02J 50/90
See application file for complete search history.

(56) References Cited

U.S. PATENT DOCUMENTS

| 2014/0132208 A1* | 5/2014 | Fisher | ..................... H02J 50/12 |
| | | | 320/108 |
| 2015/0057932 A1* | 2/2015 | Nakagawa | .............. B60L 53/38 |
| | | | 701/533 |

(Continued)

FOREIGN PATENT DOCUMENTS

| JP | 2011-106216 A | 6/2011 |
| JP | 2013-192404 A | 9/2013 |

(Continued)

Primary Examiner — Daniel Cavallari
Assistant Examiner — Rasem Mourad
(74) Attorney, Agent, or Firm — Volpe Koenig

(57) ABSTRACT

A power supply device includes: a power transmission coil unit; and a display unit displaying a mark indicating a power supply position of the movable object. A power transmission coil region of the power transmission coil unit has a point-symmetric shape with respect to a center of the power transmission coil region. The display unit includes a first display device displaying a first mark indicating a first power supply position of the movable object in a power supply space when the movable object enters the power supply space in a first direction, and a second display device displaying a second mark indicating a second power supply position of the movable object in the power supply space when the movable object enters the power supply space in a second direction opposite to the first direction.

8 Claims, 17 Drawing Sheets

(51) Int. Cl.
   *B60L 53/38*   (2019.01)
   *H02J 50/12*   (2016.01)

(56) References Cited

U.S. PATENT DOCUMENTS

| | | |
|---|---|---|
| 2015/0231981 A1* | 8/2015 | Kees .................. B60L 53/65 |
| | | 701/22 |
| 2015/0263536 A1 | 9/2015 | Niizuma |
| 2017/0158066 A1 | 6/2017 | Tokura et al. |
| 2019/0070968 A1 | 3/2019 | Fukubayashi et al. |
| 2019/0225105 A1* | 7/2019 | Niizuma ............. H02J 50/12 |
| 2021/0291682 A1* | 9/2021 | Sakakibara .......... B60W 50/14 |

FOREIGN PATENT DOCUMENTS

| | | |
|---|---|---|
| JP | 2014-093916 A | 5/2014 |
| JP | 2016-082618 A | 5/2016 |
| JP | 2017-222295 A | 12/2017 |
| JP | 2018-017085 A | 2/2018 |
| JP | 2019-092359 A | 6/2019 |
| JP | 2019-096102 A | 6/2019 |
| WO | 2017/154985 A1 | 9/2017 |

* cited by examiner

POWER SUPPLY DEVICE AND POWER SUPPLY SYSTEM

TECHNICAL FIELD

The present disclosure relates to a power supply device and a power supply system.

BACKGROUND ART

Patent Literature 1 discloses a technology relevant to a power supply device. As disclosed in Patent Literature 1, the power supply device, for example, is installed in a power supply space (parking space) that is provided in a parking lot or the like. The power supply device is used to charge a battery of a vehicle that is parked in the power supply space. The transmission of electric power to the vehicle from the power supply device is attained between a power transmission coil provided in a power supply facility and a power receiving coil provided in the vehicle.

CITATION LIST

Patent Literature

Patent Literature 1: Japanese Unexamined Patent Publication No. 2019-096102

SUMMARY OF INVENTION

Technical Problem

The power supply device described above is configured by assuming a case where the vehicle enters the power supply space from one direction. Accordingly, in order for the vehicle to perform power supplying in the power supply space, it is required to adjust an entrance direction of the vehicle when entering the power supply space to the one direction. For this reason, for example, in a case where the vehicle travels in a direction opposite to the one direction, an operation of changing a travel direction of the vehicle is required. In a case where there is no space for performing the operation of changing the travel direction of the vehicle around the power supply space, it is necessary for the vehicle to give up the power supply in the power supply space and to search for another power supply space. As described above, in the power supply device described above, since extra operations and time may be required until the vehicle performs power supplying in the power supply space, there is room for improvement in convenience.

The present disclosure describes a power supply device and a power supply system that are capable of improving convenience in power supply.

Solution to Problem

A power supply device according to one aspect of the present disclosure, includes: a power transmission coil unit installed in a power supply space and capable of wirelessly transmitting electric power with respect to a power receiving coil unit mounted on a movable object existing in the power supply space, the movable object being capable of entering the power supply space; and a display unit installed around the power transmission coil unit and displaying a mark indicating a power supply position of the movable object when the power transmission coil unit transmits power to the power receiving coil unit. When viewed from a normal direction of an installation surface of the power supply space on which the power transmission coil unit is installed, a power transmission coil region in which a power transmission coil is provided in the power transmission coil unit has a point-symmetric shape with respect to a center of the power transmission coil region. The display unit includes a first display device displaying a first mark indicating a first power supply position of the movable object in the power supply space when the movable object enters the power supply space in a first direction along an in-plane direction of the installation surface, and a second display device displaying a second mark indicating a second power supply position of the movable object in the power supply space when the movable object enters the power supply space in a second direction opposite to the first direction.

Advantageous Effects of Invention

The present disclosure describes a power supply device and a power supply system that are capable of improving convenience in power supply.

DESCRIPTION OF EMBODIMENTS

Figure 1:
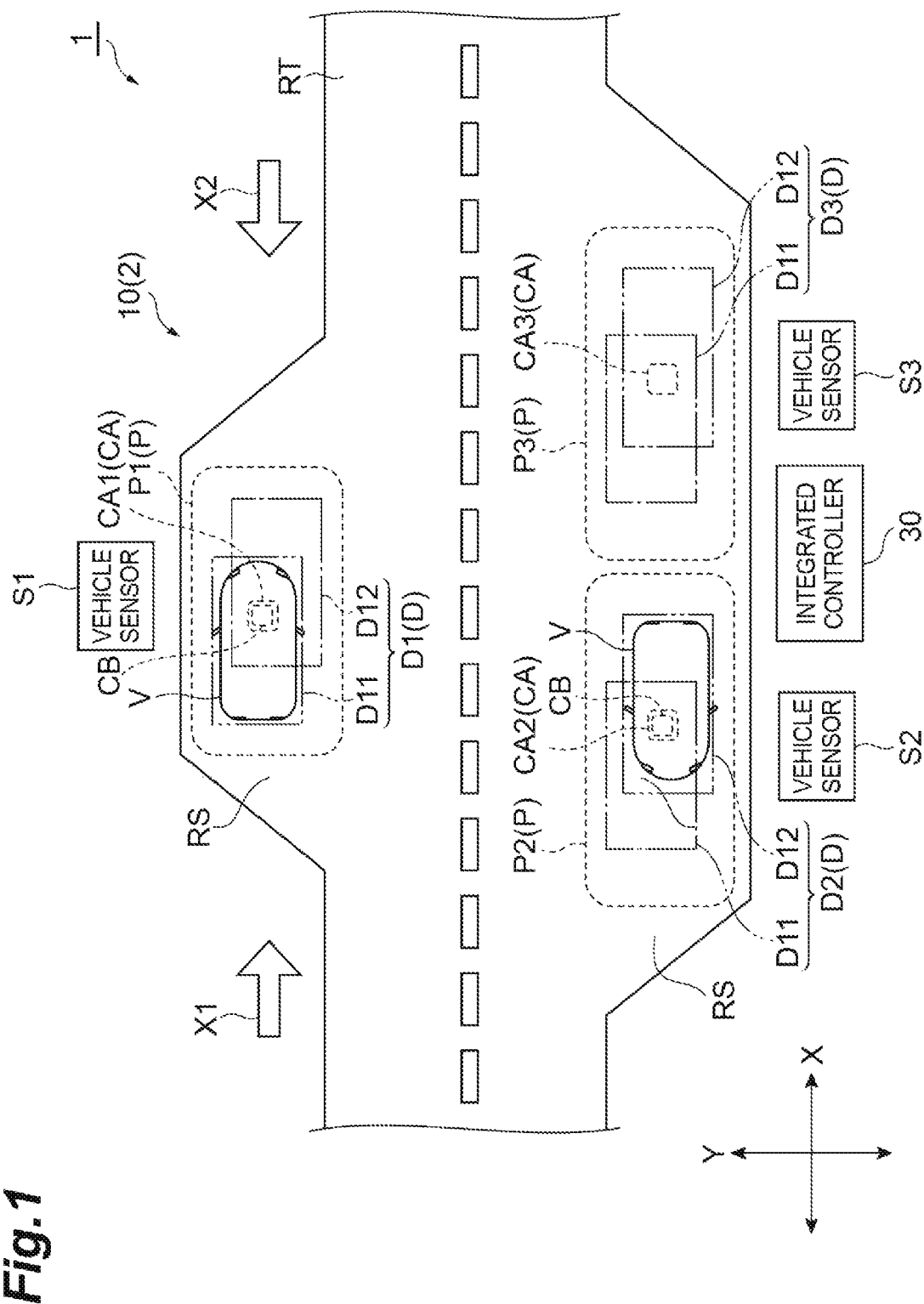
FIG. 1 is a plan view illustrating a power supply facility in which a ground-side power transmitter according to one embodiment is installed.

A power supply device according to one aspect of the present disclosure, includes: a power transmission coil unit installed in a power supply space and capable of wirelessly transmitting electric power with respect to a power receiving coil unit mounted on a movable object existing in the power supply space, the movable object being capable of entering the power supply space; and a display unit installed around the power transmission coil unit and displaying a mark indicating a power supply position of the movable object when the power transmission coil unit transmits power to the power receiving coil unit. When viewed from a normal direction of an installation surface of the power supply space on which the power transmission coil unit is installed, a power transmission coil region in which a power transmission coil is provided in the power transmission coil unit has a point-symmetric shape with respect to a center of the power transmission coil region. The display unit includes a first display device displaying a first mark indicating a first power supply position of the movable object in the power supply space when the movable object enters the power supply space in a first direction along an in-plane direction of the installation surface, and a second display device displaying a second mark indicating a second power supply position of the movable object in the power supply space when the movable object enters the power supply space in a second direction opposite to the first direction.

In the power supply device described above, the power transmission coil region has the point-symmetric shape when viewed from the normal direction. Accordingly, the shape of the power transmission coil region when viewed from the power receiving coil unit of the movable object is not changed between a case where the movable object enters the power supply space in the first direction and a case where the movable object enters the power supply space in the second direction. For this reason, insofar as the power receiving coil unit can be arranged such that one of the power receiving coil unit and the power transmission coil region falls inside the other when viewed from the normal direction in a case of power supply of the movable object that enters the power supply space in the first direction, the power receiving coil unit can similarly be arranged such that one of the power receiving coil unit and the power transmission coil region falls inside the other in a case of power supply of the movable object that enters the power supply space in the second direction. Accordingly, it is possible to allow magnetic flux generated from the power transmission coil region to efficiently reach the power receiving coil unit, and to avoid a situation in which transmission performance of power between the power receiving coil unit and the power transmission coil unit is degraded. As a result thereof, even in a case where an entrance direction of the movable object is the first direction or the second direction, desired transmission performance can be obtained. Further, in a case where the entrance direction of the movable object is the first direction, the movable object is capable of easily reaching the first power supply position by aiming for the first mark that is displayed on the first display device. In a case where the entrance direction of the movable object is the second direction, the movable object is capable of easily reaching the second power supply position by aiming for the second mark that is displayed on the second display device. As described above, in the power supply device described above, the movable object enters the power supply space from either of the both directions, and the power supplying can be performed in the power supply position with desired transmission performance. As a result thereof, since it is not necessary to perform extra operations of changing a movement direction of the movable object when performing the power supplying, it is possible to improve convenience in power supply.

In some aspects, the second display device may be installed in a position different from that of the first display device. In accordance with a mounting position of the power receiving coil unit in the movable object, the power supply positions at which the movable object needs to stop may be different from each other between a case where the entrance direction of the movable object is the first direction and a case where the entrance direction of the movable object is the second direction. In such a case, even when the entrance direction of the movable object is the first direction or the second direction, by installing the first display device and the second display device in positions different from each other, in accordance with each of the power supply positions, the movable object is capable of easily reaching the power supply position by aiming for the first mark or the second mark displayed on the positions different from each other.

In some aspects, the second display device may display the second mark in a color different from that of the first mark. In such a case, even when the entrance direction of the movable object is the first direction or the second direction, the movable object is capable of easily reaching the power supply position by aiming for the first mark or the second mark displayed in colors different from each other.

In some aspects, the power supply device may further include a display controller controlling the display unit. In a case where the movable object enters the power supply space in the first direction, the display controller may perform first control of allowing the first display device to display the first mark and the second display device to hide the second mark. In a case where the movable object enters the power supply space in the second direction, the display controller may perform second control of allowing the second display device to display the second mark and the first display device to hide the first mark. In such a configuration, in a case where the entrance direction of the movable object is the first direction, only the first mark is displayed. On the other hand, in a case where the entrance direction of the movable object is the second direction, only the second mark is displayed. As described above, by setting the first mark and the second mark not to be simultaneously displayed when the movable object enters the power supply space, it is possible to avoid a situation in which the movable object may mistakenly recognize the target mark to aim for, and to avoid a situation in which the movable object reaches a wrong power supply position. Therefore, according to the configuration described above, even in a case where the entrance direction of the movable object is the first direction or the second direction, the movable object is capable of more reliably reaching the power supply position.

In some aspects, the power supply device may further include an information processor receiving an entrance request including entrance direction information indicating an entrance direction of the movable object with respect to the power supply space from the movable object. The display controller may perform the first control when the entrance direction information indicates the first direction, and may perform the second control when the entrance direction information indicates the second direction. In such a configuration, the display controller is capable of performing display control of the first display device and the second display device at a timing when the information processor receives the entrance request from the movable object. Accordingly, the display controller is capable of displaying the first mark or the second mark, in accordance with the entrance direction of the movable object, at a suitable timing when the movable object enters the power supply space. As a result thereof, the movable object is capable of smoothly reaching the power supply position by aiming for the displayed first mark or the displayed second mark.

In some aspects, the movable object may be a vehicle capable of traveling on a traveling road. The traveling road may extend in a direction along the first direction and the second direction as an extending direction. The power supply space may be provided in a position adjacent to the traveling road in a direction intersecting the extending direction. As described above, when the power supply space is provided on the side of the traveling road, and a vehicle traveling on the traveling road in the first direction or the second direction stops by at the power supply space in order for power supply, it is assumed that the vehicle enters the power supply space from either of the first direction and the second direction. In a case where the entrance direction of the movable object with respect to the power supply space is set to only one direction, and the movable object travels in an opposite direction, extra operations of changing a travel direction of the movable object are required. In contrast, in the power supply device described above, as described above, since the vehicle is capable of entering the power supply space from either of the both directions, extra operations of changing the travel direction of the vehicle are not required, and the vehicle is capable of entering the power supply space and performing power supplying with desired transmission performance. Accordingly, in the configuration described above, the above effect of enabling the convenience in power supply to be improved can be preferably obtained.

A power supply system according to one aspect of the present disclosure, includes: the power supply device described above; and the power receiving coil unit mounted on the movable object. Since the power supply system includes the power supply device described above, and by using such a power supply system, the movable object is capable of entering the power supply space from either of the both directions and performing power supplying in the power supply position with desired transmission performance, as described above, the convenience in power supply can be improved.

In some aspects, when viewed from the normal direction, a power receiving coil region in which a power receiving coil is provided in the power receiving coil unit may have a point-symmetric shape with respect to a center of the power receiving coil region. As described above, since the power receiving coil region also has the point-symmetric shape when viewed from the normal direction, in addition to the power transmission coil region, in power supply, the aspect of allowing the magnetic flux generated from the power transmission coil region to efficiently reach the power receiving coil region can be more reliably attained. As a result thereof, it is possible to more reliably avoid a situation in which the transmission performance of the power between the power receiving coil unit and the power transmission coil unit is degraded.

Hereinafter, modes for implementing the present disclosure will be described in detail with reference to the attached drawings. In the description of the drawings, the same reference numerals will be applied to the same constituents, and the repeated description will be suitably omitted.

A power supply facility 1 illustrated in FIG. 1 is a facility for supplying electric power to one or more movable objects. The movable object, for example, is a vehicle on which an electric device that requires power supply is mounted. The electric device, for example, is a battery that requires power supply for charging, an air-conditioning device that requires power supply for driving, or the like. Examples of such a vehicle include an electric automobile or a hybrid automobile on which a battery is mounted. In the present embodiment, an electric automobile will be described as an example of the movable object, and the movable object will be referred to as a "vehicle V".

In the following description, in an in-plane direction of a road surface RS in the power supply facility 1 on which the vehicle V travels and stops, a direction in which the vehicle V moves before the start of power supply and after the end of power supply will be referred to as a front-back direction X, and a direction at a right angle with respect to the front-back direction X will be referred to as a left-right direction Y. In the front-back direction X, a direction from one side toward the other side will be referred to as a first direction X1, and a direction opposite to the first direction X1 will be referred to as a second direction X2. In a direction which is a normal direction of the road surface RS and is perpendicular to the front-back direction X and the left-right direction Y, a direction from the road surface RS toward the vehicle V will be referred to as the top, and the opposite side thereof will be referred to as the bottom.

The power supply facility 1 includes a plurality of (three in the present embodiment) power supply spaces in which power supplying is performed to the vehicle V. In the following description, in a case where it is necessary to discriminate three power supply spaces from each other, reference numerals P1, P2, and P3 will be applied to the power supply spaces. In a case where it is not necessary to discriminate three power supply spaces from each other, a reference numeral P will be simply applied to the power supply space. The power supply space P, for example, is a space at which one vehicle V is capable of stopping, and is a space extending in the front-back direction X on the road surface RS. Accordingly, the power supply space P has capaciousness in which at least one vehicle V is capable of stopping. That is, the length of the power supply space P in the front-back direction X is at least greater than the length of the vehicle V in the front-back direction X. The width of the power supply space P in the left-right direction Y is at least greater than the width of the vehicle V in the left-right direction Y.

The power supply space P, for example, is provided on the side of a traveling road RT extending in the front-back direction X. That is, the power supply space P is provided on the road surface RS adjacent to the traveling road RT in the left-right direction Y. In the present embodiment, the power supply space P is provided on the road surface RS on both sides of the traveling road RT in the left-right direction Y. More specifically, as illustrated in FIG. 1, one power supply space P1 is arranged on the road surface RS on one side of the traveling road RT in the left-right direction Y. Then, two power supply spaces P2 and P3 are arranged on the road surface RS on the other side of the traveling road RT in the left-right direction Y. The power supply spaces P2 and P3 are arranged in parallel in the front-back direction X. The traveling road RT, for example, is a two-traffic lane road including a traffic lane in which the first direction X1 is set as a travel direction of the vehicle V, and a traffic lane in which the second direction X2 is set as the travel direction of the vehicle V. The traveling road RT may be a left-hand traffic road, or may be a right-hand traffic road.

In the power supply facility 1, a ground-side power transmitter 10 (power supply device) is installed. In a case where the vehicle V traveling on the traveling road RT in the front-back direction X requires power supply, the vehicle V enters the power supply space P from the traveling road RT in the first direction X1 or the second direction X2. The ground-side power transmitter 10 performs power supplying the vehicle V that enters the power supply space P. The number of vehicles V that are capable of stopping at the power supply facility 1 is identical to the number of power supply spaces P. In an example illustrated in FIG. 1, since the number of power supply spaces P is 3, a maximum of three vehicles V are capable of stopping at the power supply facility 1. The number of vehicles V that are capable of stopping at the power supply facility 1 can be suitably changed by increasing and decreasing the number of power supply spaces P, in accordance with a specification to be required for the power supply facility 1.

The ground-side power transmitter 10 is capable of supplying power to a plurality of vehicles V that stop at the power supply facility 1. In the example illustrated in FIG. 1, the ground-side power transmitter 10 is capable of supplying power to a maximum of three vehicles V that are capable of stopping at the power supply facility 1. The ground-side power transmitter 10 is also capable of supplying power to one vehicle V, and is also capable of simultaneously supplying power to the plurality of vehicles V. Timings for supplying power to the plurality of vehicles V by the ground-side power transmitter 10 are independent from each other. Accordingly, a timing for supplying power to a certain vehicle V can be determined without being affected by a timing for supplying power to another vehicle V.

The ground-side power transmitter 10 configures a power supply system 2 together with a vehicle-side power receiver 20 mounted on the vehicle V. The power supply system 2 wirelessly supplies power to the vehicle-side power receiver 20 of the vehicle V that stops at the power supply space P from the ground-side power transmitter 10 by using magnetic coupling between the ground-side power transmitter 10 and the vehicle-side power receiver 20. A power supply method of the power supply system 2, for example, is magnetic resonance or electromagnetic induction.

The ground-side power transmitter 10 includes a plurality of (three in the present embodiment) power transmission coil units, a plurality of (three in the present embodiment) display units, and a plurality of (three in the present embodiment) vehicle sensors. Further, the ground-side power transmitter 10 includes an integrated controller 30 controlling the plurality of power transmission coil units and the plurality of display units. In the following description, in a case where it is necessary to discriminate the plurality of power transmission coil units from each other, reference numerals of CA1, CA2, and CA3 will be applied to the power transmission coil units. In a case where it is not necessary to discriminate the plurality of power transmission coil units from each other, a reference numeral CA will be applied to the power transmission coil unit. Similarly, in a case where it is necessary to discriminate the plurality of display units from each other, reference numerals D1, D2, and D3 will be applied to the display units. In a case where it is not necessary to discriminate the plurality of display units from each other, a reference numeral D will be applied to the display unit. Similarly, in a case where it is necessary to discriminate the plurality of vehicle sensors from each other, reference numerals S1, S2, and S3 will be applied to the vehicle sensors. In a case where it is not necessary to discriminate the plurality of vehicle sensors from each other, a reference numeral S will be applied to the vehicle sensor.

The power transmission coil unit CA, the display unit D, and the vehicle sensor S are provided corresponding to each of the power supply spaces P. That is, for one power supply space P, one power transmission coil unit CA, one display unit D, and one vehicle sensor S are provided. For the power supply space P1, the power transmission coil unit CA1, the display unit D1, and the vehicle sensor S1 are provided. For the power supply space P2, the power transmission coil unit CA2, the display unit D2, and the vehicle sensor S2 are provided. For the power supply space P3, the power transmission coil unit CA3, the display unit D3, and the vehicle sensor S3 are provided.

Figure 2A:
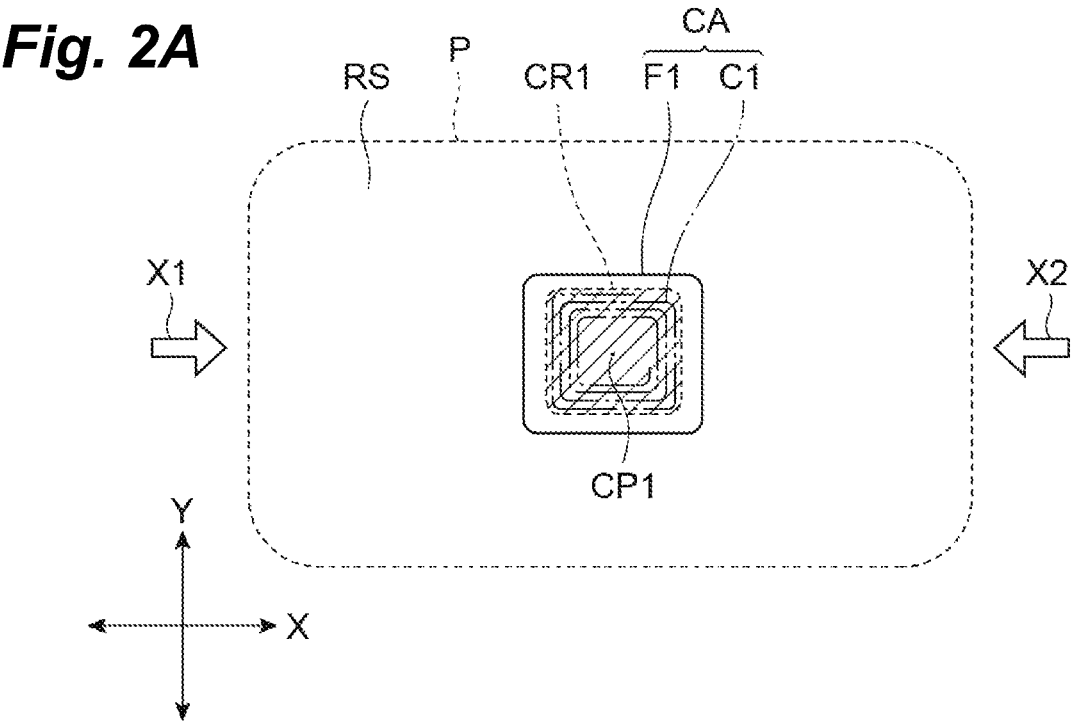
FIG. 2A is an enlarged plan view illustrating a power transmission coil unit of the ground-side power transmitter in FIG. 1.

As illustrated in FIG. 2A, the power transmission coil unit CA, for example, is installed in the center of the power supply space P on the road surface RS. The power transmission coil unit CA may be embedded under the road surface RS, or may protrude from the road surface RS. The road surface RS is an installation surface in the power supply space P on which the power transmission coil unit CA is installed. The power transmission coil unit CA includes a power transmission coil C1, and a ferrite plate F1 which is a magnetic member. The power transmission coil C1 and the ferrite plate F1 are contained in a housing that is not illustrated. In the housing, other components (such as a resonant circuit) that are capable of configuring the power transmission coil unit CA may be contained, in addition to the power transmission coil C1 and the ferrite plate F1. The power transmission coil unit CA may include a magnetic member configured of a magnetic material other than ferrite, instead of the ferrite plate F1. The magnetic member such as the ferrite plate F1 is not necessarily configured of one plate, and may be configured by arranging a plurality of small plate-shaped magnetic members into the shape of a plate as a whole.

The power transmission coil C1 is a spinal coil in which a conductive wire such as a litz wire is wound. In the present embodiment, a case will be exemplified in which the power transmission coil C1 is a circular coil. The power transmission coil C1, for example, may be other types of coils such as a solenoid coil. The power transmission coil C1 wirelessly transmits power received from a power supply unit that is not illustrated to a power receiving coil C2 (refer to FIG. 2B) of the vehicle V existing in the power supply space P, in an alternating-current magnetic field. The power supply unit converts alternating-current power or direct-current power supplied from a power source to desired alternating-current power, and supplies the desired alternating-current power (for example, high-frequency power of 100 kHz) to the power transmission coil C1. The power supply unit, for example, includes an inverter circuit. The power supply unit may suitably include a rectification circuit, a converter circuit, and the like, in accordance with whether the power from the power source is the direct-current power or the alternating-current power.

In FIG. 2A, a power transmission coil region CR1 (a hatched part) in which the power transmission coil C1 is provided in the power transmission coil unit CA is illustrated. The power transmission coil region CR1 is a region overlapping with the power transmission coil C1 in the power transmission coil unit CA when viewed from above, and is one closed region including the power transmission coil C1. In the present embodiment, when viewed from above, the power transmission coil region CR1 indicates the entire region positioned inside the outermost edge of the power transmission coil C1. In such a case, the outer edge of the power transmission coil region CR1 overlaps with the outermost edge of the power transmission coil C1. For this reason, the outer shape of the power transmission coil region CR1 is a shape following the outer shape of the power transmission coil C1. Hereinafter, the configuration of the power transmission coil region CR1 when viewed from above will be described.

The power transmission coil region CR1 has a point-symmetric shape with respect to a center CP1 of the power transmission coil region CR1. Accordingly, when rotating the power transmission coil region CR1 by 180° in a circumferential direction of the center CP1, the outer shape of the power transmission coil region CR1 after the rotation is coincident with the outer shape of the power transmission coil region CR1 before the rotation. The positions of the start and the end of the conductive wire of the power transmission coil C1 inside the power transmission coil region CR1 before the rotation of the power transmission coil region CR1 are not coincident with those after the rotation of the power transmission coil region CR1. However, the power transmission coil region CR1 is considered to have the point-symmetric shape, if the outer shape of the power transmission coil region CR1 is the point-symmetric shape with no consideration given a difference in the configuration inside the power transmission coil region CR1 (that is, a difference in the positions of the start and the end of the conductive wire of the power transmission coil C1).

In an example illustrated in FIG. 2A, the shape of the power transmission coil region CR1 is a square shape. The shape of the power transmission coil region CR1 is not limited to the example illustrated in FIG. 2A, and may be a shape other than the square shape, for example, a rectangular shape insofar as the shape is point-symmetrical with respect to the center CP1. In a case where the shape of the power transmission coil region CR1 is the square shape, it is not necessary that the shape of the power transmission coil region CR1 is strictly the square shape. The power transmission coil C1 has a configuration in which the conductive wire is wound. For this reason, four corners of the power transmission coil region CR1 may be rounded corresponding to the bend radius of the conductive wire, in accordance with the winding of the conductive wire. Accordingly, in a case where the shape of the power transmission coil region CR1 is the square shape, the shape of the power transmission coil region CR1 may include a square shape having four rounded corners. The outer shape of the ferrite plate F1 is basically configured to follow the outer shape of the power transmission coil C1. Accordingly, the outer shape of the ferrite plate F1 can be set to a square shape, as with the outer shape of the power transmission coil region CR1. A region including the power transmission coil C1 and the ferrite plate F1 may be defined as the power transmission coil region CR1. The housing in which the power transmission coil C1 is contained can be configured of a non-electrically conductive and non-magnetic material (for example, a resin member) that does not affect magnetic coupling between the power transmission coil C1 and the power receiving coil C2. For this reason, the dimension or the shape of the housing does not affect power transmission performance between the power transmission coil unit CA and a power receiving coil unit CB. Accordingly, it is not necessary that the housing has a point-symmetric shape when viewed from above.

Figure 2B:
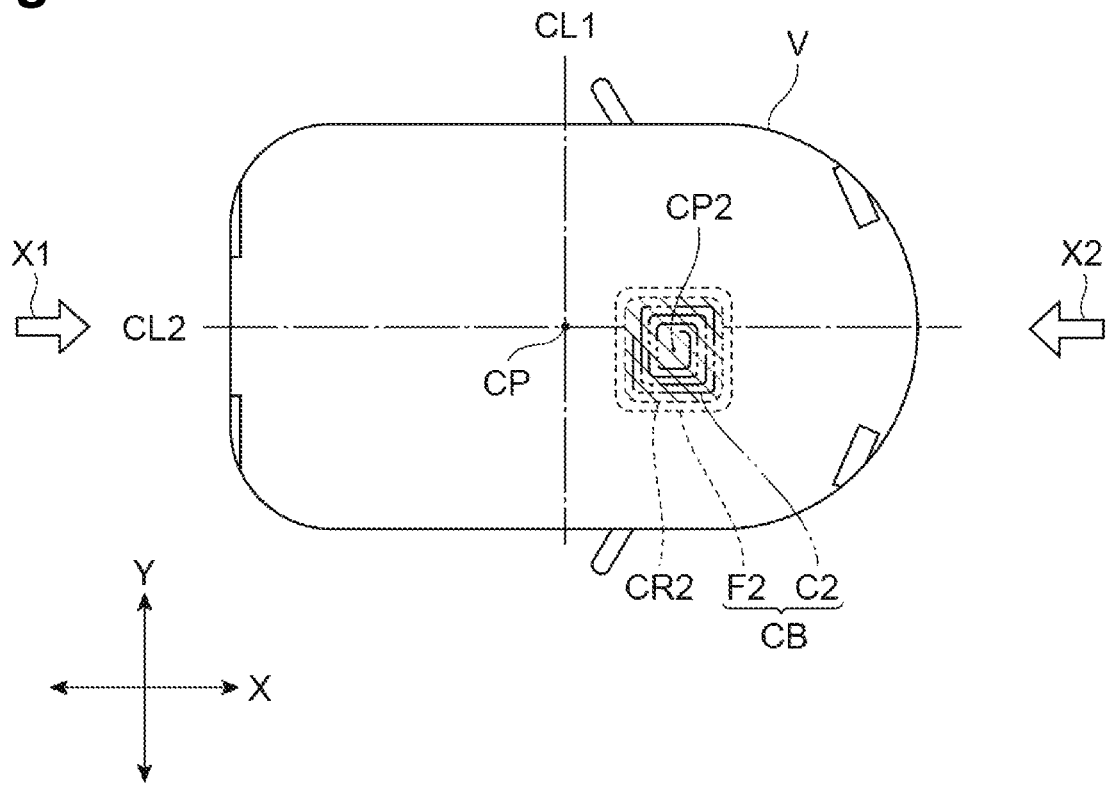
FIG. 2B is an enlarged plan view illustrating a power receiving coil unit of a vehicle-side power receiver in FIG. 1.

The vehicle-side power receiver 20 mounted on the vehicle V, as illustrated in FIG. 2B, includes the power receiving coil unit CB. The power receiving coil unit CB includes the power receiving coil C2, and a ferrite plate F2 which is a magnetic member. The power receiving coil C2 and the ferrite plate F2 are contained in a housing that is not illustrated. In the housing, other components (such as a resonant circuit) that are capable of configuring the power receiving coil unit CB may be contained, in addition to the power receiving coil C2 and the ferrite plate F2. The power receiving coil C2 is a spinal coil in which a conductive wire such as a litz wire is wound. In the present embodiment, as with the power transmission coil C1, a case will be exemplified in which the power receiving coil C2 is a circular coil. The power receiving coil C2, for example, may be other types of coils such as a solenoid coil. The power receiving coil unit CB may include a magnetic member configured of a magnetic material other than ferrite, instead of the ferrite plate F2. The magnetic member such as the ferrite plate F2 is not necessarily configured of one plate, and may be configured by arranging a plurality of small plate-shaped magnetic members into the shape of a plate as a whole. One of the power transmission coil unit CA and the power receiving coil unit CB may include the magnetic member configured of ferrite (that is, the ferrite plate F1 or the ferrite plate F2). The other of the power transmission coil unit CA and the power receiving coil unit CB may include the magnetic member configured of the magnetic material other than ferrite. The housing in which the power receiving coil C2 is contained can be configured of a non-electrically conductive and non-magnetic material (for example, a resin member) that does not affect the magnetic coupling between the power transmission coil C1 and the power receiving coil C2. For this reason, the dimension or the shape of the housing does not affect the power transmission performance between the power transmission coil unit CA and the power receiving coil unit CB. Accordingly, it is not necessary that the housing has a point-symmetric shape when viewed from above.

As illustrated in FIG. 2B, the power receiving coil unit CB, for example, is arranged in a position misaligned from each of a center line CL1 of the vehicle V in the front-back direction X and a center line CL2 of the vehicle V in the left-right direction Y. For example, the power receiving coil unit CB may be arranged at the foot of a driver seat on the front side from the center line CL1 (for example, a position misaligned from the front end of the vehicle V to the rear side by ⅓ of the entire length of the vehicle V in the front-back direction X). As described above, in a case where the power receiving coil unit CB is arranged in a position misaligned from the center CP of the vehicle V (that is, an intersecting point between the center lines CL1 and CL2) when viewed from above, a power supply position at which the vehicle V that enters the power supply space P from the first direction X1 needs to stop to receive power from the power transmission coil unit CA is different from a power supply position at which the vehicle V that enters the power supply space P from the second direction X2 needs to stop to receive power from the power transmission coil unit CA.

In FIG. 2B, a power receiving coil region CR2 (a hatched part) in which the power receiving coil C2 is provided in the power receiving coil unit CB is illustrated. As with the power transmission coil region CR1, the power receiving coil region CR2 is a region overlapping with the power receiving coil C2 in the power receiving coil unit CB when viewed from above, and is one closed region including the power receiving coil C2. In the present embodiment, when viewed from above, the power receiving coil region CR2 indicates the entire region positioned inside the outermost edge of the power receiving coil C2. In such a case, the outer edge of the power receiving coil region CR2 overlaps with the outermost edge of the power receiving coil C2. For this reason, the outer shape of the power receiving coil region CR2 is a shape following the outer shape of the power receiving coil C2. Hereinafter, the configuration of the power receiving coil region CR2 when viewed from above will be described.

The power receiving coil region CR2 has a point-symmetric shape with respect to a center CP2 of the power receiving coil region CR2. The shape of the power receiving coil region CR2, for example, is the same square shape as the power transmission coil region CR1. In a case where the shape of the power receiving coil region CR2 is the square shape, as described above, it is not necessary that the shape of the power receiving coil region CR2 is strictly the square shape, and four corners of the square shape may be rounded. The outer shape of the ferrite plate F2 is basically configured to follow the outer shape of the power receiving coil C2. Accordingly, the outer shape of the ferrite plate F2 can be set to a square shape, as with the outer shape of the power receiving coil region CR2. A region including the power receiving coil C2 and the ferrite plate F2 may be defined as the power receiving coil region CR2. The power transmission coil region CR1, for example, has an area slightly larger than that of the power receiving coil region CR2. For this reason, when the power receiving coil unit CB reaches a position facing the power transmission coil unit CA in a vertical direction, the power receiving coil region CR2 can be positioned inside the power transmission coil region CR1. The power receiving coil region CR2 may have a point-symmetric shape different from that of the power transmission coil region CR1. For example, the shape of the power transmission coil region CR1 may be a square shape, whereas the shape of the power receiving coil region CR2 may be a rectangular shape other than the square shape. Alternatively, the shape of the power transmission coil region CR1 may be the rectangular shape other than the square shape, whereas the shape of the power receiving coil region CR2 may be the square shape. Alternatively, the both shapes of the power transmission coil region CR1 and the power receiving coil region CR2 may be the rectangular shape other than the square shape. In such a case, aspect ratios of the rectangular shapes may be different from each other between the power transmission coil region CR1 and the power receiving coil region CR2.

Refer to FIG. 1 again. The display unit D is arranged around the power transmission coil unit CA when viewed from above. The display unit D displays a mark indicating the power supply position of the vehicle V to the vehicle V that enters the power supply space P. The power supply position is a position at which the vehicle V that enters the power supply space P needs to stop in the power supply space P in order to receive power from the power transmission coil unit CA. That is, the power supply position is a stop position at which the vehicle V needs to stop when the power receiving coil unit CB of vehicle V reaches the position facing the power transmission coil unit CA in the vertical direction. In the present embodiment, the power supply position of the vehicle V that enters the power supply space P in the first direction X1 may be referred to as a first power supply position, and the power supply position of the vehicle V that enters the power supply space P in the second direction X2 may be referred to as a second power supply position. The power receiving coil unit CB and the power transmission coil unit CA may be in a positional relationship in which there is a possibility that desired power transmission performance can be attained. The power receiving coil unit CB and the power transmission coil unit CA need not be exactly parallel, and their vertical positions need not match exactly. The desired power transmission performance, for example, indicates that a desired power transmission amount or more is attained or a desired power transmission efficiency or more is attained between the power receiving coil unit CB and the power transmission coil unit CA. Accordingly, the power receiving coil unit CB may be positioned in a range where desired power transmission performance can be attained with respect to the power transmission coil unit CA. For example, a misalignment may occur between the power receiving coil unit CB and the power transmission coil unit CA, in the range where the desired power transmission performance (hereinafter, may be simply referred to as "transmission performance") can be attained.

The display unit D includes a first display device D11 installed on the road surface RS of the power supply space P, and a second display device D12 installed in a position different from that of the first display device D11 on the road surface RS of the power supply space P. Each of the first display device D11 and the second display device D12, for example, is a light emitting unit configured of one or a plurality of LEDs installed on the road surface RS of the power supply space P. Each of the first display device D11 and the second display device D12 may be embedded in the road surface RS, or may be arranged on the road surface RS. When viewed from above, the first display device D11 is installed on the road surface RS of the power supply space P into the shape of a rectangular frame surrounding the vehicle V when the vehicle V that enters the power supply space P in the first direction X1 reaches the first power supply position. When viewed from above, the second display device D12 is installed on the road surface RS of the power supply space P into the shape of a rectangular frame surrounding the vehicle V when the vehicle V that enters the power supply space P in the second direction X2 reaches the second power supply position.

The respective ranges of the frames of the first display device D11 and the second display device D12, when viewed from above, are set to ranges in which the power receiving coil unit CB of the vehicle V is capable of attaining desired transmission performance with respect to the power transmission coil unit CA when the vehicle V stops inside the frame. Accordingly, in order for the power receiving coil unit CB to attain desired transmission performance with respect to the power transmission coil unit CA, it is necessary that the vehicle V stops inside the frame of the first display device D11 when the vehicle V enters the power supply space P in the first direction X1. On the other hand, it is necessary that the vehicle V stops inside the frame of the second display device D12 when the vehicle V enters the power supply space P in the second direction X2. When viewed from above, the frames of the first display device D11 and the second display device D12 may be installed not to overlap with the vehicle V, or may be installed to overlap with the vehicle V.

Figure 3A:
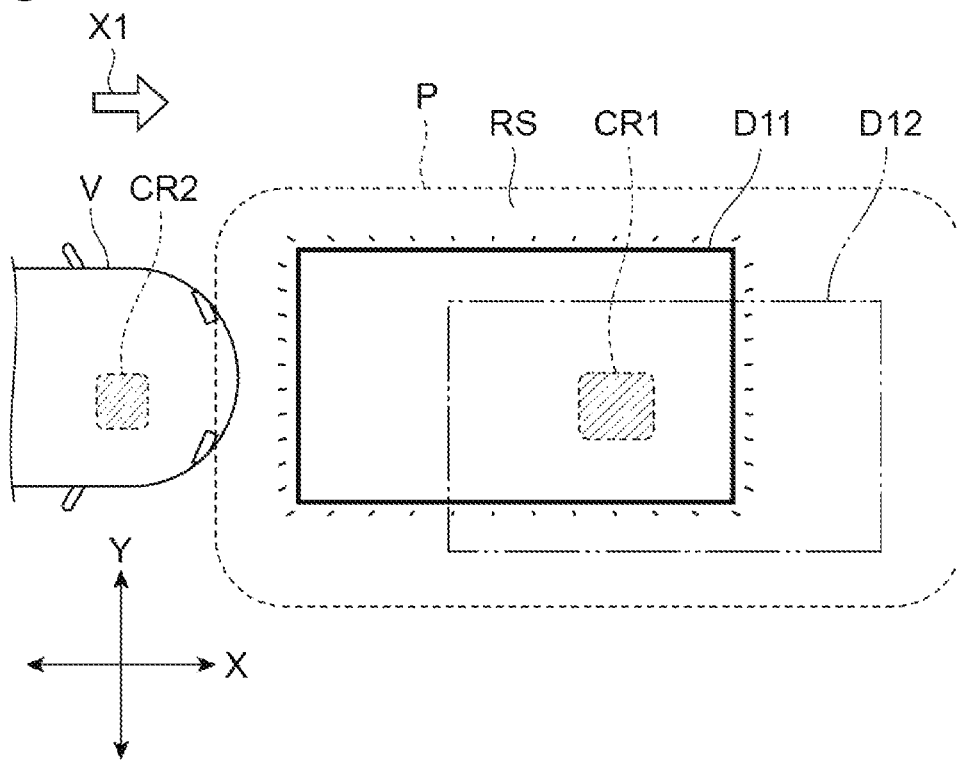
FIG. 3A is a plan view illustrating a state when a vehicle enters a power supply space in a first direction.
Figure 4A:
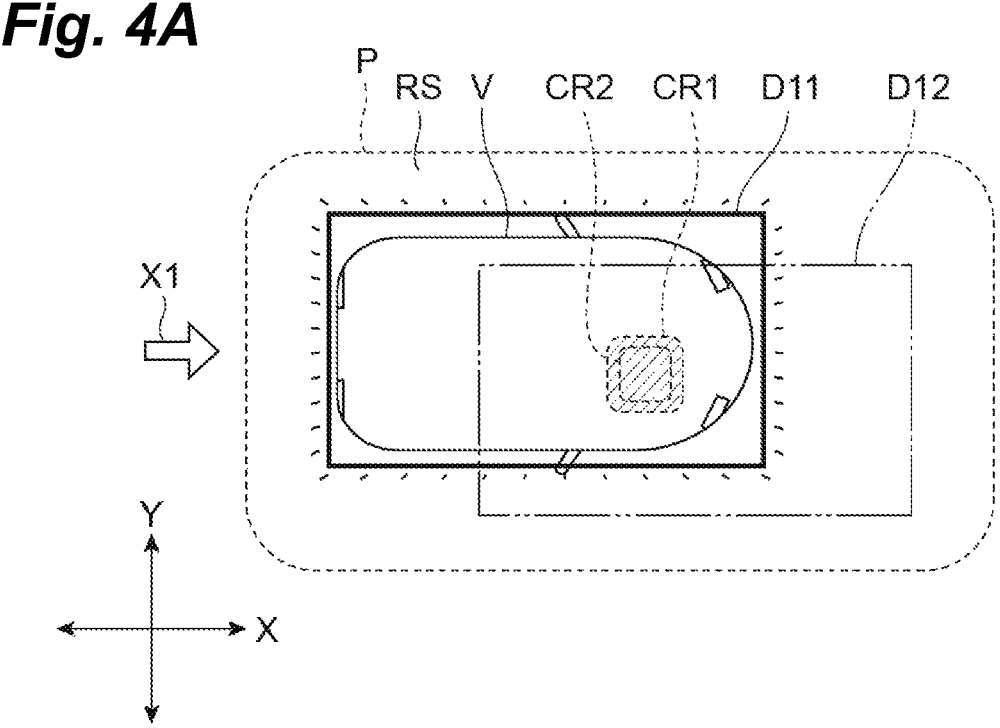
FIG. 4A is a plan view illustrating a state when the vehicle that enters the power supply space in the first direction reaches a first power supply position.

Each of the first display device D11 and the second display device D12 is configured to emit light by receiving power from a power source device that is not illustrated, in accordance with an instruction from the integrated controller 30. The color of the light emitted from the first display device D11 and the second display device D12 may be any color as long as it is discriminable from the color of the road surface RS. For example, the color of the light emitted from the first display device D11 and the second display device D12 may be white, or may be other colors. The color of the light emitted from the first display device D11 and the color of the light emitted from the second display device D12, for example, may be different from each other. Before the vehicle V enters the power supply space P, each of the first display device D11 and the second display device D12 is in a light-off state. As illustrated in FIG. 3A, in a case where the vehicle V enters the power supply space P in the first direction X1, the first display device D11 is switched to a light-on state from the light-off state. At this time, the second display device D12 is in the light-off state. After that, as illustrated in FIG. 4A, the vehicle V stops inside the frame of the first display device D11 by aiming for the first display device D11 in the light-on state. Accordingly, the vehicle V is capable of reaching the first power supply position.

Accordingly, it can be said that the first display device D11 in the light-on state is in a state of displaying a first mark indicating the first power supply position of the vehicle V that enters the power supply space P in the first direction X1. On the contrary, in a case where the first display device D11 is in the light-off state (refer to FIG. 3B), since it is not possible or it is difficult for the vehicle V to recognize the first display device D11 in the light-off state, it can be said that the first mark indicating the first power supply position is not displayed. That is, it can be said that the first display device D11 in the light-off state is in a state of hiding the first mark indicating the first power supply position of the vehicle V that enters the power supply space P in the first direction X1. In the present embodiment, a state in which the display device is in the light-on state also includes a state in which the display device intermittently emits light (that is, a state in which the display device is blinking), in addition to a state in which the display device is continuously emitting light.

Figure 3B:
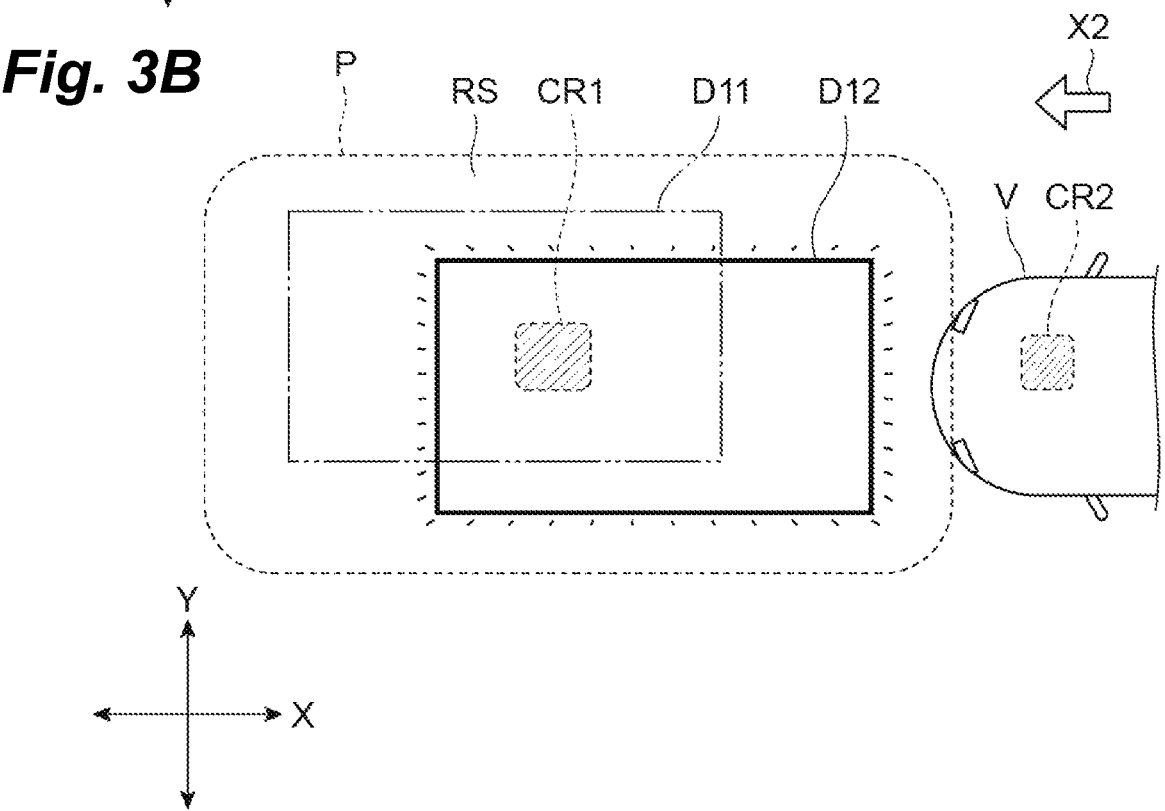
FIG. 3B is a plan view illustrating a state when the vehicle enters the power supply space in a second direction.
Figure 4B:
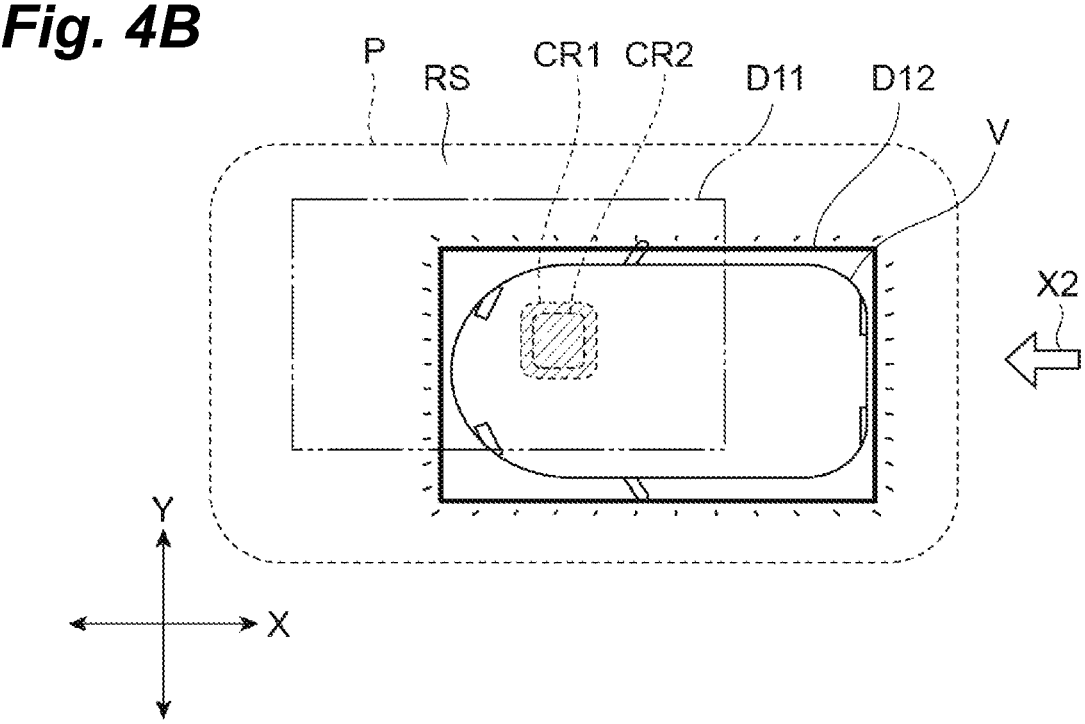
FIG. 4B is a plan view illustrating a state when the vehicle that enters the power supply space in the second direction reaches a second power supply position.

On the other hand, as illustrated in FIG. 3B, in a case where the vehicle V enters the power supply space P in the second direction X2, the second display device D12 is switched to the light-on state from the light-off state. At this time, the first display device D11 is in the light-off state. After that, as illustrated in FIG. 4B, the vehicle V stops inside the frame of the second display device D12 by aiming for the second display device D12 in the light-on state. Accordingly, the vehicle V is capable of reaching the second power supply position. Accordingly, it can be said that the second display device D12 in the light-on state is in a state of displaying a second mark indicating the second power supply position of the vehicle V that enters the power supply space P in the second direction X2. On the contrary, in a case where the second display device D12 is in the light-off state (refer to FIG. 3A), since it is not possible or it is difficult for the vehicle V to recognize the second display device D12 in the light-off state, it can be said that the second mark indicating the second power supply position is not displayed to the vehicle V. That is, it can be said that the second display device D12 in the light-off state is in a state of hiding the second mark indicating the second power supply position of the vehicle V that enters the power supply space P in the second direction X2.

As described above, due to the fact that the power receiving coil unit CB is arranged in a position misaligned from the center CP of the vehicle V when viewed from above, the second power supply position of the vehicle V when entering the power supply space P in the second direction X2 is a position misaligned from the first power supply position of the vehicle V when entering the power supply space P in the first direction X1. According to this, the second display device D12 indicating the second power supply position of the vehicle V when entering the power supply space P in the second direction X2 is also installed in a position misaligned from the first display device D11 indicating the first power supply position of the vehicle V when entering the power supply space P in the first direction X1.

In a case where a driver of the vehicle V visually recognizes the light emitted from the first display device D11 and the second display device D12, it is necessary that each of the first display device D11 and the second display device D12 emits visible light. In such a case, the driver of the vehicle V may recognize the first display device D11 or the second display device D12 in the light-on state by visual observation. On the other hand, for example, in a case where the light emitted from the first display device D11 and the second display device D12 is imaged with a camera, each of the first display device D11 and the second display device D12 may emit light other than the visible light (for example, infrared light), insofar as the emitted light can be imaged with the camera. In such a case, the first display device D11 or the second display device D12 in the light-on state may be recognized by being sensed with the camera (a sensor).

Refer to FIG. 1 again. The vehicle sensor S is a sensor for sensing whether or not there are unoccupied power transmission coil units CA among the plurality of power transmission coil units CA. The vehicle sensor S, for example, is provided in a position adjacent to the power supply space P in the left-right direction Y. The vehicle sensor S, for example, senses whether or not the vehicle V stops in order to receive power from the power transmission coil unit CA in the power supply space P by using infrared light, laser light, or the like. The vehicle sensor S transmits a sensing result thereof to the integrated controller 30. For example, the vehicle sensor S may project a beam of laser light in the direction of the power supply space P. In a case where the vehicle V stops at the power supply space P, the beam is reflected on the surface of the vehicle V. On the other hand, in a case where the vehicle V does not stop at the power supply space P, there is no reflection of the beam from the vehicle V. Therefore, the vehicle sensor S may sense whether or not the vehicle V stops at the power supply space P by sensing the presence or absence of the reflection of the beam from the vehicle V. In the example illustrated in FIG.

1, the vehicles V stop at the power supply space P1 and the P2, respectively, in order for power supply. For this reason, the vehicle sensor S1 transmits a sensing result indicating that the vehicle V stops at the power supply space P1 to the integrated controller 30. Similarly, the vehicle sensor S2 transmits a sensing result indicating that the vehicle V stops at the power supply space P2 to the integrated controller 30. On the other hand, since the vehicle V does not stop at the power supply space P3, the vehicle sensor S3 transmits a sensing result indicating that the vehicle V does not stop at the power supply space P3 to the integrated controller 30.

In the example illustrated in FIG. 1, since only the power transmission coil unit CA3 of the power supply space P3 is unoccupied, the integrated controller 30 is capable of determining that there is an unoccupied power transmission coil unit CA. In a case where the vehicles V stop at all of the power supply spaces P1, P2, and P3, the integrated controller 30 is capable of determining that there are no unoccupied power transmission coil units CA. In the present embodiment, a case will be exemplified in which one vehicle sensor S is provided in each of the power transmission coil units CA. However, one vehicle sensor may be provided for all of the power transmission coil units CA. In such a case, one vehicle sensor including all of the power supply spaces P in a sensing range may be used. Such a vehicle sensor may sense whether or not the vehicle V stops at each of the power supply spaces P. In a case where one vehicle sensor is used as described above, the vehicle sensor, for example, may determine whether or not the vehicle V stops at each of the power supply spaces P by image processing using an image of a camera installed such that all of the power supply spaces P come into view.

Figure 5:
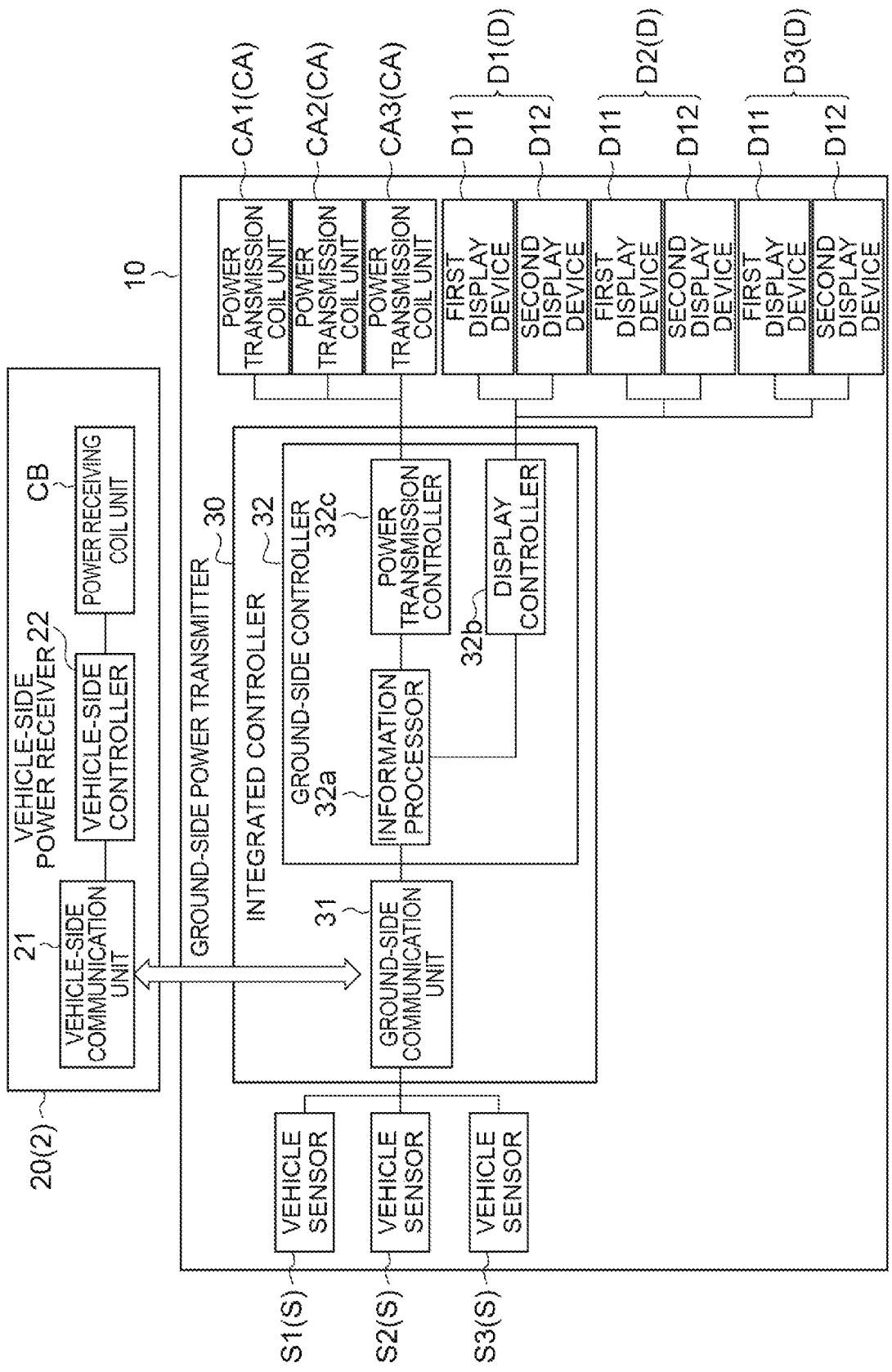
FIG. 5 is a block diagram illustrating a functional configuration of the ground-side power transmitter and the vehicle-side power receiver.

The integrated controller 30 receives information from the vehicle-side power receiver 20 and the vehicle sensor S, and controls the power transmission coil unit CA and the display unit D. The integrated controller 30, for example, is provided in a position adjacent to the power supply space P in the left-right direction Y. The integrated controller 30, for example, may be provided in a building that looks onto the traveling road RT. As illustrated in FIG. 5, the integrated controller 30 includes a ground-side communication unit 31 and a ground-side controller 32. The ground-side communication unit 31 is configured such that wireless communication can be performed with respect to the vehicle V. The ground-side communication unit 31 is capable of performing wireless communication with respect to the vehicle V by using a known wireless communication method. In a case where a distance between the ground-side communication unit 31 and the vehicle V is within a communication start distance set in advance, the ground-side communication unit 31, for example, may automatically transit to a state in which communication is available. The ground-side communication unit 31 is configured such that communication can be performed with respect to the vehicle sensor S, and is capable of receiving the sensing result from the vehicle sensor S.

The ground-side controller 32 performs power transmission control of the power transmission coil unit CA, and display control of the display unit D, on the basis of a communication result of the ground-side communication unit 31. The ground-side controller 32, for example, is configured of an electronic control unit including a central processing unit (CPU), a read only memory (ROM), a random access memory (RAM), and the like. The ground-side controller 32 functionally includes an information processor 32a, a display controller 32b, and a power transmission controller 32c.

The information processor 32a receives an entrance request from the vehicle V through the ground-side communication unit 31. The entrance request is transmitted from the vehicle V to request the entrance of the vehicle V with respect to the power supply space P. The entrance request includes identification information of the vehicle V, and entrance direction information of the vehicle V with respect to the power supply space P. The identification information of the vehicle V indicates an identification number for wireless communication that is allocated in advance to each of the vehicles V The entrance direction information of the vehicle V indicates whether an entrance direction of the vehicle V with respect to the power supply space P is the first direction X1 or the second direction X2. The information processor 32a is capable of identifying which vehicle V transmits the entrance request by referring to the identification information of the vehicle V.

In a case where the entrance request is received, the information processor 32a receives the sensing result from the vehicle sensor S through the ground-side communication unit 31. The information processor 32a determines whether or not there are unoccupied power transmission coil units CA (that is, whether or not the vehicle V stops at the power supply space P in which the power transmission coil unit CA is installed), on the basis of the sensing result. In a case where there are no unoccupied power transmission coil units CA, the information processor 32a determines that there are no unoccupied power transmission coil units CA. In such a case, the vehicle V is not capable of performing power supplying in the power supply space P. For this reason, the information processor 32a transmits an entrance unavailable notification indicating that the entrance of the vehicle V with respect to the power supply space P is not available to the vehicle V that is identified by the identification information through the ground-side communication unit 31.

On the other hand, in a case where there are one or more unoccupied power transmission coil units CA, the information processor 32a determines that there are unoccupied power transmission coil units CA, and selects one unoccupied power transmission coil unit CA. In such a case, the vehicle V is capable of performing power supplying in the power supply space P in which the selected power transmission coil unit CA is installed. For this reason, the information processor 32a transmits an entrance available notification indicating that the entrance of the vehicle V with respect to the power supply space P in which the selected power transmission coil unit CA is installed is available to the vehicle V that is identified by the identification information through the ground-side communication unit 31.

When the information processor 32a transmits the entrance available notification, information indicating whether the unoccupied power supply space P is on the left side or the right side with respect to the traveling road RT may also be transmitted to the vehicle V. For example, in a case where the power supply space P1 is unoccupied, the information processor 32a may transmit information indicating that the power supply space P1 is on the left side with respect to the vehicle V that travels in the first direction X1 to the vehicle V. Accordingly, the vehicle V easily reaches the power supply space P. In a case where only one power transmission coil unit CA is installed in the power supply facility 1, it is not necessary that the information processor 32a performs processing of selecting one unoccupied power transmission coil unit CA. The information processor 32a outputs a display control instruction for controlling the display of the display unit D corresponding to the selected power transmission coil unit CA, together with the entrance direction information included in the entrance request, to the display controller 32b.

The display controller 32b receives the display control instruction from the information processor 32a, and controls the display of the display unit D corresponding to the selected power transmission coil unit CA. Specifically, in a case where the entrance direction information included in the entrance request indicates the first direction X1, the display controller 32b performs first control of allowing only the first display device D11 to emit light. In the first control, the first display device D11 is in the light-on state, whereas the second display device D12 is in the light-off state. The display controller 32b performs the first control, thereby allowing the vehicle V that enters the power supply space P in the first direction X1 to reach the first power supply position (refer to FIG. 4A).

On the other hand, in a case where the entrance direction information indicates the second direction X2, the display controller 32b performs second control of allowing only the second display device D12 to emit light. In the second control, the second display device D12 is in the light-on state, whereas the first display device D11 is in the light-off state. The display controller 32b performs the second control, thereby allowing the vehicle V that enters the power supply space P in the second direction X2 to reach the second power supply position (refer to FIG. 4B). The display controller 32b allows the vehicle V to reach the power supply position by the first control or the second control, and then, sets both of the first display device D11 and the second display device D12 to be in the light-off state. That is, in a period from when the vehicle V stops at the power supply position to when the vehicle V departs from the power supply space P, and a period in which the vehicle V does not exist in the power supply space P, the display controller 32b sets both of the first display device D11 and the second display device D12 to be in the light-off state. The entrance request may not include the entrance direction information. In such a case, the information processor 32a may create the entrance direction information by automatically recognizing the entrance direction of the vehicle V, and may output the entrance direction information to the display controller 32b. For example, a camera capturing the vehicle V that enters the power supply space P in the first direction X1 and a camera capturing the vehicle V that enters the power supply space P in the second direction X2 may be provided in a position adjacent to the traveling road RT. The information processor 32a may determine which camera captures the vehicle V in the image by image processing, thereby recognizing the entrance direction of the vehicle V.

In a case where the vehicle V that enters the power supply space P in the first direction X1 or the second direction X2 reaches the power supply position, the information processor 32a receives a stop completion notification indicating that the vehicle V stops at the power supply position from the vehicle V through the ground-side communication unit 31. The information processor 32a receives the stop completion notification, and outputs a power transmission instruction to the power transmission coil unit CA. The power transmission controller 32c receives the power transmission instruction from the information processor 32a, and outputs a power transmission start instruction for allowing the power transmission coil unit CA to start power transmission. After that, in a case where it is determined that the charge of the vehicle V is completed, the power transmission controller 32c outputs a power transmission stop instruction for allowing the power transmission coil unit CA to stop the power transmission. The power transmission controller 32c, for example, may determine that the charge of the vehicle V is completed when a given length of time has elapsed after the power transmission coil unit CA starts the power transmission. The power transmission controller 32c may determine that the charge of the vehicle V is completed when the battery of the vehicle V is fully charged.

As illustrated in FIG. 5, the vehicle-side power receiver 20 further includes a vehicle-side communication unit 21 and a vehicle-side controller 22. The vehicle-side communication unit 21 is configured such that wireless communication can be performed with respect to the ground-side communication unit 31. The vehicle-side controller 22 controls the vehicle V, on the basis of a communication result of the ground-side communication unit 31. The vehicle-side controller 22, for example, is configured of an electronic control unit including a central processing unit (CPU), a read only memory (ROM), a random access memory (RAM), and the like.

In a case where it is necessary that the vehicle V enters the power supply space P in order for power supply, the vehicle-side controller 22 transmits the entrance request to the information processor 32a of the ground-side controller 32 through the vehicle-side communication unit 21. After that, the vehicle-side controller 22 receives the entrance unavailable notification or the entrance available notification from the information processor 32a through the vehicle-side communication unit 21. In a case where the vehicle-side controller 22 receives the entrance unavailable notification, the driver of the vehicle V gives up the entrance of the vehicle V with respect to the power supply space P of the power supply facility 1, and searches for another power supply facility 1. On the other hand, in a case where the vehicle-side controller 22 receives the entrance available notification, the driver of the vehicle V stops the vehicle V at the power supply position by aiming for the first display device D11 or the second display device D12 in the light-on state.

In a case where it is determined that the vehicle V stops at the power supply position, the vehicle-side controller 22 transmits the stop completion notification indicating that the vehicle V stops at the power supply position to the information processor 32a through the vehicle-side communication unit 21. The vehicle-side controller 22, for example, determines that the vehicle V stops at the power supply position when the vehicle V falls inside the frame of the first display device D11 or the second display device D12. Whether or not the vehicle V falls inside the frame of the first display device D11 or the second display device D12 may be checked by the visual observation of the driver of the vehicle V, or may be checked by the camera of the vehicle V, or the like. After that, in a case where the power transmission of the power transmission coil unit CA is started, power is wirelessly supplied to the power receiving coil unit CB, the supplied power is used in the charge of the battery of the vehicle V, or the like. Then, in a case where the vehicle-side controller 22 determines that the power supply (charge) of the vehicle V is completed, the driver of the vehicle V moves the vehicle V to the traveling road RT from the power supply space P to travel on the traveling road RT.

Figure 6:
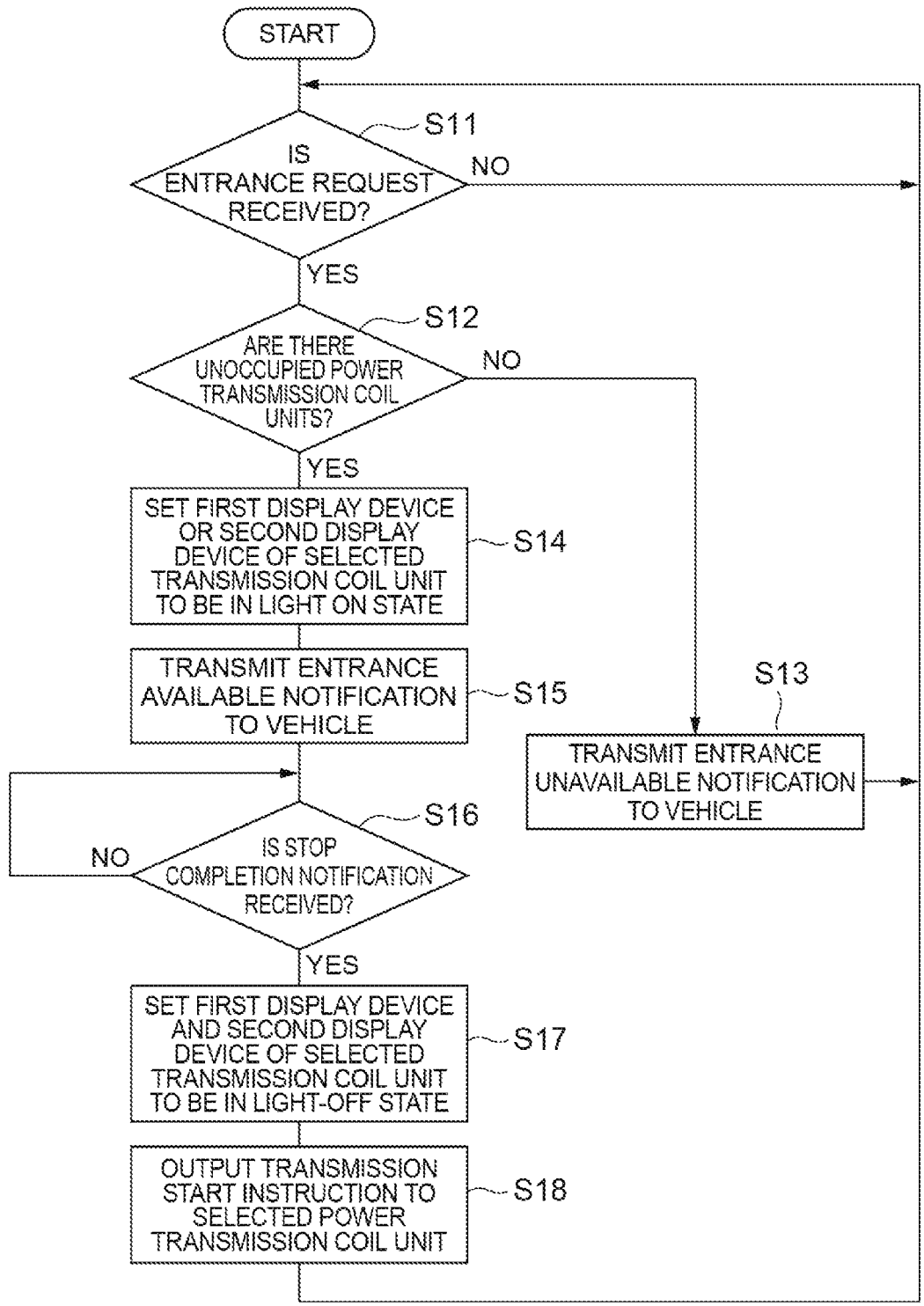
FIG. 6 is a flowchart illustrating a control flow of a ground-side controller from when the vehicle starts to enter the power supply space to when charging is completed in the power supply position.
Figure 7:
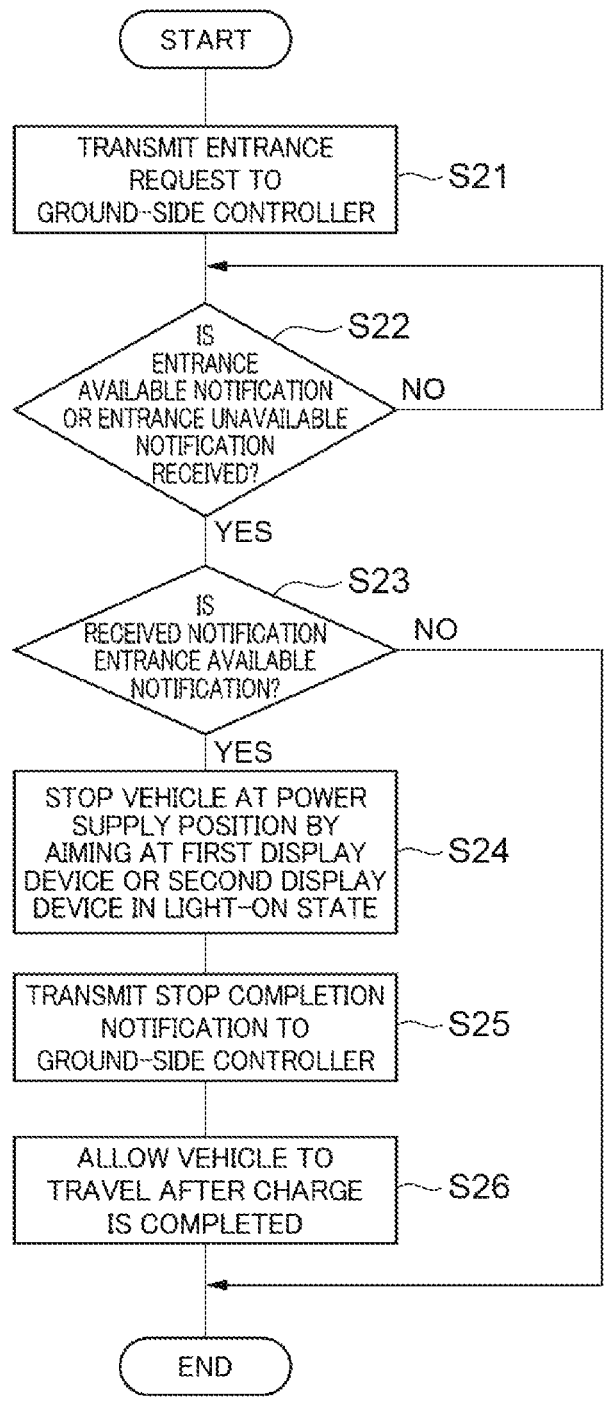
FIG. 7 is a flowchart illustrating a control flow of a vehicle-side controller from when the vehicle starts to enter the power supply space to when charging is completed in the power supply position.

Subsequently, a set of control flows from when the vehicle V starts to enter the power supply space P to when the charge is completed in the power supply position will be described with reference to FIG. 6 and FIG. 7. FIG. 6 illustrates a control flow of the ground-side controller 32. FIG. 7 illustrates a control flow of the vehicle-side controller 22.

First, in a case where the vehicle V that requires power supply reaches the power supply facility 1, the vehicle-side controller 22 transmits the entrance request to the information processor 32a of the ground-side controller 32 through the vehicle-side communication unit 21 and the ground-side communication unit 31 (step S21 of FIG. 7). As described above, the entrance request includes the identification information and the entrance direction information of the vehicle V.

Next, the information processor 32a determines whether or not the entrance request is received from the vehicle-side controller 22 (step S11 of FIG. 6). In a case where it is determined that the entrance request is not received ("No" in step S11 of FIG. 6), the information processor 32a performs step S11 again. On the other hand, in a case where it is determined that the entrance request is received ("Yes" in step S11 of FIG. 6), the information processor 32a receives the sensing result from the vehicle sensor S through the ground-side communication unit 31. Then, the information processor 32a determines whether or not there are unoccupied power transmission coil units CA, on the basis of the sensing result (step S12 of FIG. 6).

In a case where it is determined that there are no unoccupied power transmission coil units CA ("No" in step S12 of FIG. 6), the information processor 32a transmits the entrance unavailable notification to the vehicle-side controller 22 of the vehicle V that is identified by the identification information through the ground-side communication unit 31 and the vehicle-side communication unit 21. On the other hand, in a case where it is determined that there are unoccupied power transmission coil units CA ("Yes" in step S12 of FIG. 6), the information processor 32a selects any one of the unoccupied power transmission coil units CA. In the present embodiment, the power transmission coil unit CA that is selected by the information processor 32a is any one of the power transmission coil unit CA1, the power transmission coil unit CA2, and the power transmission coil unit CA3. The display controller 32b performs the first control or the second control with respect to the display unit D corresponding to the power transmission coil unit CA that is selected by the information processor 32a, thereby setting any one of the first display device D11 and the second display device D12 to be in the light-on state (step S14 of FIG. 6). The display controller 32b keeps both of the first display device D11 and the second display device D12 to be in the light-off state, before performing the first control or the second control.

In a case where the entrance direction information included in the entrance request is the first direction X1, the display controller 32b performs the first control in which the first display device D11 of the selected power transmission coil unit CA is turned to the light-on state, whereas the second display device D12 of the selected power transmission coil unit CA is turned to the light-off state. In such a case, the first display device D11 of the selected power transmission coil unit CA is switched to the light-on state from the light-off state. The second display device D12 of the selected power transmission coil unit CA remains in the light-off state. On the other hand, in a case where the entrance direction information is the second direction X2, the display controller 32b performs the second control in which the second display device D12 of the selected power transmission coil unit CA is turned to the light-on state, whereas the first display device D11 of the selected power transmission coil unit CA is turned to the light-off state. In such a case, the second display device D12 of the selected power transmission coil unit CA is switched to the light-on state from the light-off state. The first display device D11 of the selected power transmission coil unit CA remains in the light-off state. After that, the information processor 32a transmits the entrance available notification to the vehicle-side controller 22 of the vehicle V that is identified by the identification information through the ground-side communication unit 31 and the vehicle-side communication unit 21 (step S15 of FIG. 6).

Next, the vehicle-side controller 22 determines whether or not the entrance available notification or the entrance unavailable notification is received from the information processor 32a (step S22 of FIG. 7). In a case where it is determined that the entrance available notification or the entrance unavailable notification is not received ("No" in step S22 of FIG. 7), the vehicle-side controller 22 performs step S22 again. On the other hand, in a case where it is determined that the entrance available notification or the entrance unavailable notification is received ("Yes" in step S22 of FIG. 7), the vehicle-side controller 22 determines whether or not the received notification is the entrance available notification (step S23 of FIG. 7). In a case where the vehicle-side controller 22 determines that the received notification is not the entrance available notification ("No" in step S23 of FIG. 7), the vehicle-side controller 22 may notify to the effect that the entrance with respect to the power supply space P is not available to the driver of the vehicle V. As a result thereof, the driver of the vehicle V gives up the entrance of the vehicle V with respect to the power supply space P of the power supply facility 1, and searches for another power supply facility 1.

On the other hand, in a case where the vehicle-side controller 22 determines that the received notification is the entrance available notification ("Yes" in step S23 of FIG. 7), the vehicle-side controller 22 may notify to the effect that the entrance with respect to the power supply space P is available to the driver of the vehicle V. As a result thereof, the driver of the vehicle V stops the vehicle V at the power supply position by aiming for the first display device D11 or the second display device D12 in the light-on state (step S24 of FIG. 7). After that, the vehicle-side controller 22 transmits the stop completion notification to the information processor 32a of the ground-side controller 32 through the vehicle-side communication unit 21 and the ground-side communication unit 31 (step S25 of FIG. 7).

Next, the information processor 32a determines whether or not the stop completion notification is received from the vehicle-side controller 22 (step S16 of FIG. 6). In a case where it is determined that the stop completion notification is not received ("No" in step S16 of FIG. 6), the information processor 32a performs step S16 again. On the other hand, in a case where the information processor 32a determines that the stop completion notification is received ("Yes" in step S16 of FIG. 6), the display controller 32b sets both of the first display device D11 of the selected power transmission coil unit CA and the second display device D12 of the selected power transmission coil unit CA to be in the light-off state (step S17 of FIG. 6). Next, the power transmission controller 32c outputs the power transmission start instruction to the selected power transmission coil unit CA (step S18 of FIG. 6). In the preceding control flow, an operation of one vehicle V entering the power supply space P and starting charge in the power supply position is completed. As a result thereof, another vehicle V is capable of entering the power supply space P and performing charge in the power supply position. The information processor 32a returns to the beginning of the flowchart of FIG. 6, and waits for the entrance request from the another vehicle V.

On the other hand, the selected power transmission coil unit CA continues the power transmission with respect to the vehicle V. After that, in a case where it is determined that the charge of the vehicle V is completed, the power transmission controller 32c outputs the power transmission stop instruction to the power transmission coil unit CA. After the charge of the vehicle V is completed and the power transmission of the power transmission coil unit CA is stopped, the vehicle-side controller 22 may notify to the effect that the power transmission is stopped to the driver of the vehicle V As a result thereof, the driver of the vehicle V moves the vehicle V to the traveling road RT from the power supply space P to travel on the traveling road RT (step S26 of FIG. 7).

<Function Effect>

Figure 17A:
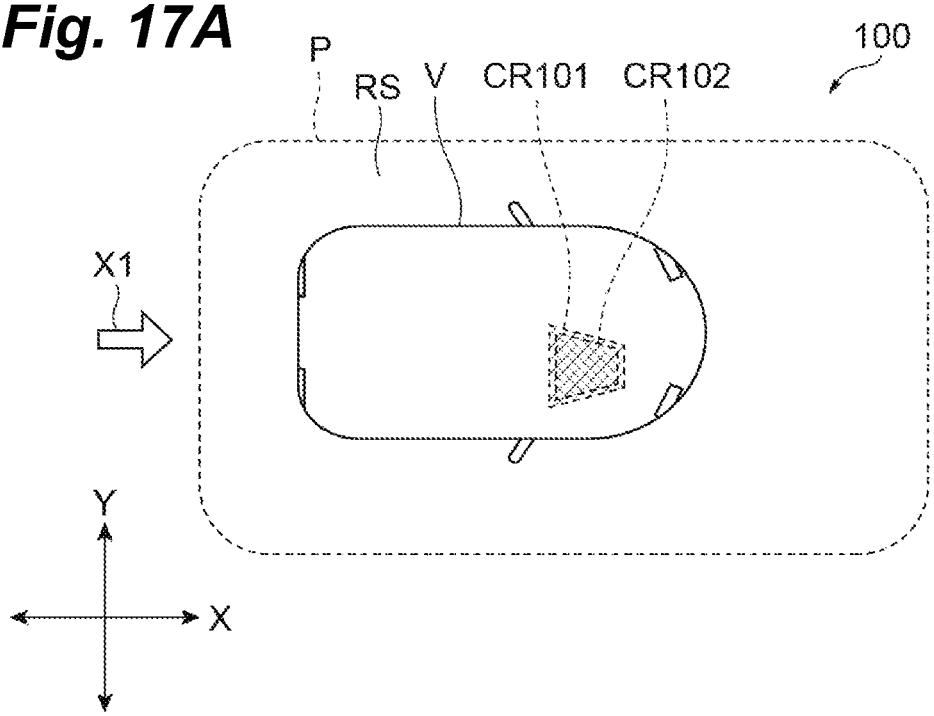
FIG. 17A is a plan view illustrating a state when the vehicle enters the power supply space in which a ground-side power transmitter according to a comparative example is installed in the first direction.
Figure 17B:
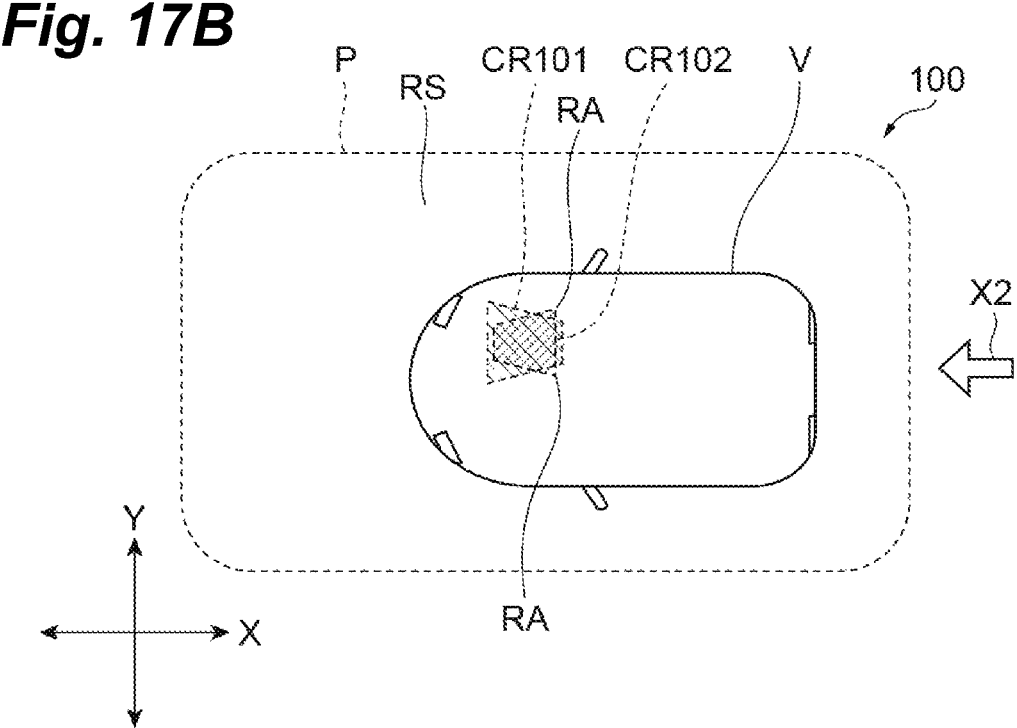
FIG. 17B is a plan view illustrating a state when the vehicle enters the power supply space in which the ground-side power transmitter according to the comparative example is installed in the second direction.

Function effects obtained by the ground-side power transmitter 10 and the power supply system 2 described above will be described together with the problems of a comparative example. A ground-side power transmitter 100 according to the comparative example illustrated in FIGS. 17A and 17B is configured by assuming that power supplying is performed with respect to the vehicle V that enters the power supply space P from one direction (for example, the first direction X1). For this reason, in the ground-side power transmitter 100 according to the comparative example, both of a power transmission coil region CR101 and a power receiving coil region CR102 do not have a point-symmetric shape when viewed from above, unlike the ground-side power transmitter 10 according to the present embodiment. In examples illustrated in FIGS. 17A and 17B, each of the power transmission coil region CR101 and the power receiving coil region CR102 has a trapezoidal shape. The power transmission coil region CR101 has an area slightly larger than that of the power receiving coil region CR102.

As illustrated in FIG. 17A, in a case where the vehicle V enters the power supply space P in the first direction X1 which is one direction and reaches the first power supply position, the power receiving coil region CR102 falls inside the power transmission coil region CR101 when the power receiving coil region CR102 overlaps in the vertical direction with the power transmission coil region CR101. In such a case, a non-overlapping region that does not overlap with the power transmission coil region CR101 does not occur in the power receiving coil region CR102. For this reason, magnetic flux generated from the power transmission coil region CR101 efficiently reaches the power receiving coil region CR102. Accordingly, in a case where the vehicle V enters the power supply space P in the first direction X1, power can be transmitted to the power receiving coil unit from the power transmission coil unit with desired transmission performance.

On the other hand, as illustrated in FIG. 17B, in a case where the vehicle V enters the power supply space P in the second direction X2 which is an opposite direction and reaches the second power supply position, the power receiving coil region CR102 does not fall inside the power transmission coil region CR101 when the power receiving coil region CR102 overlaps in the vertical direction with the power transmission coil region CR101, and a non-overlapping region RA that does not overlap with the power transmission coil region CR101 occurs in the power receiving coil region CR102. In such a case, it is difficult for the magnetic flux generated from the power transmission coil region CR101 to reach the non-overlapping region RA of the power receiving coil region CR102. For this reason, transmission performance between the power transmission coil unit and the power receiving coil unit may be degraded, and desired transmission performance may not be obtained.

As described above, in the ground-side power transmitter 100 according to the comparative example, since it is necessary that the vehicle V enters the power supply space P from one direction in order to obtain desired transmission performance, in a case where the travel direction of the vehicle V is the opposite direction, it is necessary for the vehicle V to enter the power supply space P from the one direction after changing the travel direction of the vehicle V. Accordingly, in the ground-side power transmitter 100 according to the comparative example, since an operation of changing the travel direction of the vehicle V is required, extra time is required until the vehicle V enters the power supply space P and performs power supplying. Further, in a case where the power supply space P is provided on a narrow road in which there is no space for changing the travel direction of the vehicle V, the vehicle V is not capable of changing the travel direction. In this case, it is necessary for the driver of the vehicle V to give up the power supply in the power supply space P or to search for another power supply space.

In contrast, in the ground-side power transmitter 10 and the power supply system 2 according to the present embodiment, each of the power transmission coil region CR1 and the power receiving coil region CR2 has the point-symmetric shape when viewed from above. Accordingly, the shape of the power transmission coil region CR1 when viewed from the power receiving coil unit CB of the vehicle V is not changed between a case where the vehicle V enters the power supply space P in the first direction X1 and a case where the vehicle V enters the power supply space P in the second direction X2. As a result thereof, insofar as the power receiving coil unit CB is arranged such that the power receiving coil region CR2 falls inside the power transmission coil region CR1 when viewed from above in a case of the power supply of the vehicle V that enters the power supply space P in the first direction X1 (refer to FIG. 4A), the power receiving coil unit CB can similarly be arranged such that the power receiving coil region CR2 falls inside the power transmission coil region CR1 in a case of the power supply of the vehicle V that enters the power supply space P in the second direction X2 (refer to FIG. 4B). In such a case, even when the entrance direction of the vehicle V is the first direction X1 or the second direction X2, the non-overlapping region with the power transmission coil region CR1 does not occur in the power receiving coil region CR2. For this reason, it is possible to allow the magnetic flux generated from the power transmission coil region CR1 to efficiently reach the power receiving coil region CR2, and to avoid a situation in which the transmission performance of the power between the power receiving coil unit CB and the power transmission coil unit CA is degraded. As a result thereof, even in a case where the entrance direction of the vehicle V is the first direction X1 or the second direction X2, desired transmission performance can be obtained.

Further, in a case where the entrance direction of the vehicle V is the first direction X1, the vehicle V is capable of easily reaching the first power supply position by aiming for the first display device D11 in the light-on state. In a case where the entrance direction of the vehicle V is the second direction X2, the vehicle V is capable of easily reaching the second power supply position by aiming for the second display device D12 in the light-on state. As described above, in the ground-side power transmitter 10 described above, the vehicle V is capable of entering the power supply space P from either of the both directions, and even in a case where the entrance direction of the vehicle V is the first direction X1 or the second direction X2, the vehicle V is capable of easily reaching the power supply position. As a result thereof, the vehicle V is capable of performing power supplying in the power supply position with desired transmission performance. Accordingly, it is not necessary for the vehicle V to perform extra operations of changing the travel direction in order to perform power supplying in the power supply space P with desired transmission performance. Further, even after the power supplying is completed, the vehicle V is capable of restarting traveling without changing the travel direction. As described above, in the present embodiment, extra time is not required when the vehicle V performs the power supplying in the power supply space P.

Figure 8:
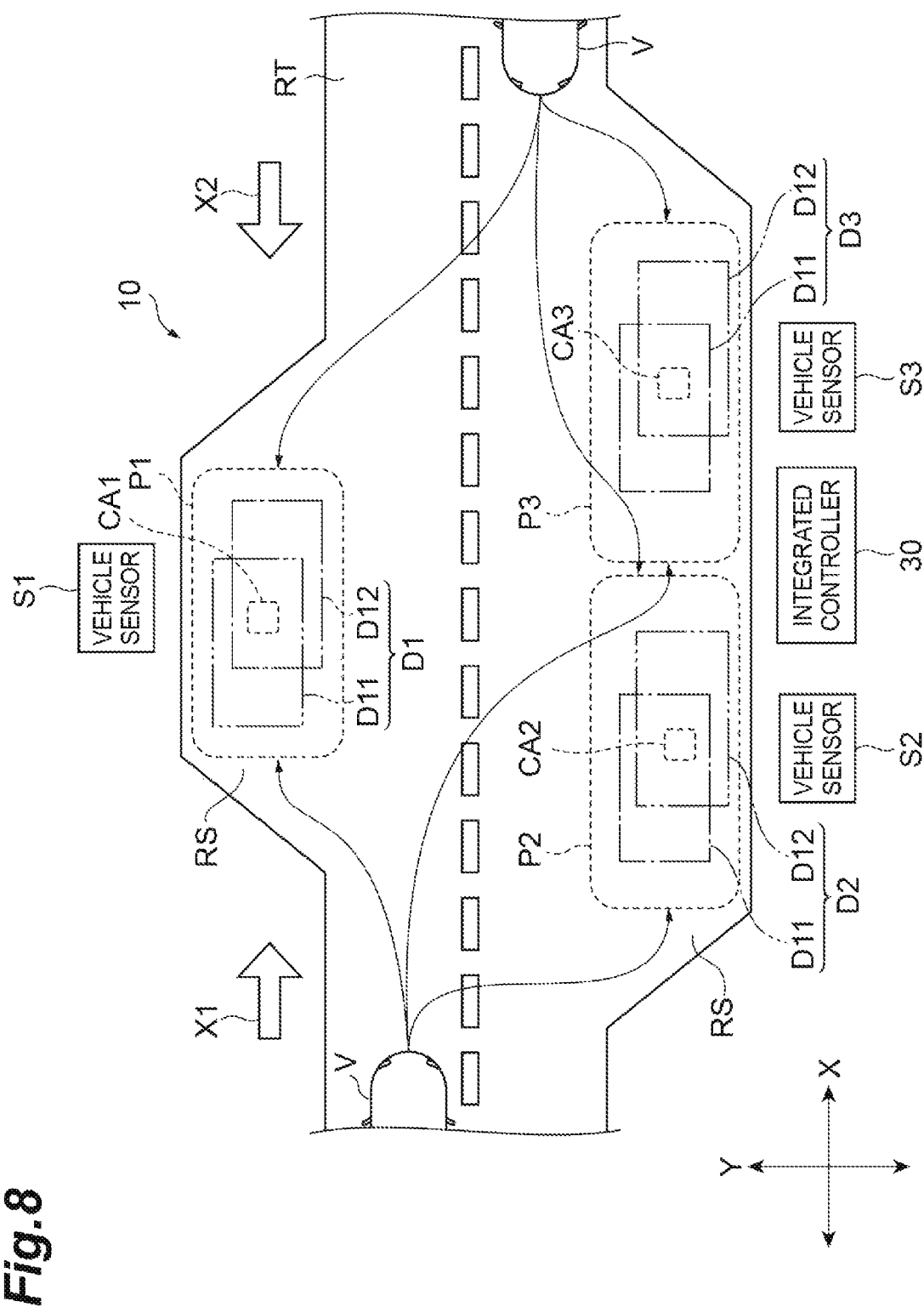
FIG. 8 is a diagram for describing an effect of the ground-side power transmitter.

Accordingly, as illustrated in FIG. 8, the vehicle V that travels on the traveling road RT in the first direction X1 may enter any of the power supply spaces P1, P2, and P3 in the first direction X1 without changing the travel direction. The vehicle V that travels on the traveling road RT in the second direction X2 may enter any of the power supply spaces P1, P2, and P3 in the second direction X2 without changing the travel direction. For this reason, for example, in a case where another vehicle V stops at any one of the power supply spaces P, the vehicle V is capable of entering any of the power supply spaces P except for the power supply space P at which another vehicle V stops without changing the travel direction. Further, even in a case where the power supply space is provided on a narrow road in which there is no space for the vehicle V to change the travel direction, the vehicle V is capable of entering the power supply space regardless of the travel direction and receiving power. As described above, in the ground-side power transmitter 10 and the power supply system 2 according to the present embodiment, since it is possible to increase an opportunity that the vehicle V is capable of performing the power supplying in the power supply space, the convenience in power supply can be improved. As a result thereof, the ground-side power transmitter 10 can be more effectively operated.

The second display device D12 is installed in a position different from that of the first display device D11. As with the present embodiment, the power supply positions at which the vehicle V needs to stop may be different from each other between a case where the entrance direction of the vehicle V is the first direction X1 and a case where the entrance direction of the vehicle V is the second direction X2. In such a case, the vehicle V is capable of easily reaching the power supply position by aiming for the first display device D11 and the second display device D12 installed in positions different from each other, in accordance with each of the power supply positions.

The second display device D12 may emit light in a color different from that of the first display device D11. In such a case, the vehicle V is capable of easily reaching the power supply position by aiming for the first display device D11 or the second display device D12 displayed in colors different from each other.

In a case where the vehicle V enters the power supply space P in the first direction X1, the display controller 32*b* may perform the first control in which the first display device D11 is turned to the light-on state, whereas the second display device D12 is turned to the light-off state. In a case where the vehicle V enters the power supply space P in the second direction X2, the display controller 32*b* may perform the second control in which the second display device D12 is turned to the light-on state, whereas the first display device D11 is turned to the light-off state. In such a configuration, in a case where the entrance direction of the vehicle V is the first direction X1, only the first display device D11 is turned to the light-on state. On the other hand, in a case where the entrance direction of the vehicle V is the second direction X2, only the second display device D12 is turned to the light-on state. As described above, by setting the first display device D11 and the second display device D12 not to be simultaneously in the light-on state when the vehicle V enters the power supply space P, it is possible to avoid a situation in which the vehicle V mistakenly recognizes the mark to aim for, and to avoid a situation in which the vehicle V reaches a wrong power supply position. Accordingly, according to the configuration described above, even in a case where the entrance direction of the vehicle V is the first direction X1 or the second direction X2, the vehicle V is capable of more reliably reaching the power supply position.

In a case where the entrance direction information of the vehicle V that is included in the entrance request indicates the first direction X1, the display controller 32*b* performs the first control. In a case where the entrance direction information of the vehicle V that is included in the entrance request indicates the second direction X2, the display controller 32*b* performs the second control. In such a configuration, the display controller 32*b* is capable of controlling the display of the first display device D11 and the second display device D12 at a timing when the information processor 32*a* receives the entrance request from the vehicle V. Accordingly, the display controller 32*b* is capable of setting the first display device D11 or the second display device D12 to be in the light-on state, in accordance with the entrance direction of the vehicle V, at a suitable timing when the vehicle V enters the power supply space P. As a result thereof, the vehicle V is capable of smoothly reaching the power supply position by aiming for the first display device D11 or the second display device D12 in the light-on state.

The power supply space P is provided in a position adjacent to the traveling road RT in the left-right direction Y. As described above, when the power supply space P is provided on the side of the traveling road RT, and the vehicle V that travels on the traveling road RT in the first direction X1 or the second direction X2 stops by at the power supply space P in order for power supply, it is assumed that the vehicle V enters the power supply space P from either of the first direction X1 and the second direction X2. If the entrance direction of the vehicle V with respect to the power supply space P is set to only one direction, and the vehicle V travels in an opposite direction, extra operations of changing the travel direction of the vehicle V are required. In contrast, in the present embodiment, as described above, the vehicle V is capable of entering the power supply space P from either of the both directions. Then, the vehicle V is capable of entering the power supply space P and performing the power supplying with desired transmission performance, without requiring the extra operations of changing the travel direction of the vehicle V. Accordingly, in the configuration described above, the above effect of enabling the convenience in power supply to be improved can be preferably obtained.

The ground-side power transmitter 10 and the power supply system 2 of the present disclosure are not limited to the embodiment described above. The ground-side power transmitter 10 and the power supply system 2 of the present disclosure may be suitably changed in specific aspects within a range not departing from the gist of the claims.

Modification Example 1

Figure 9:
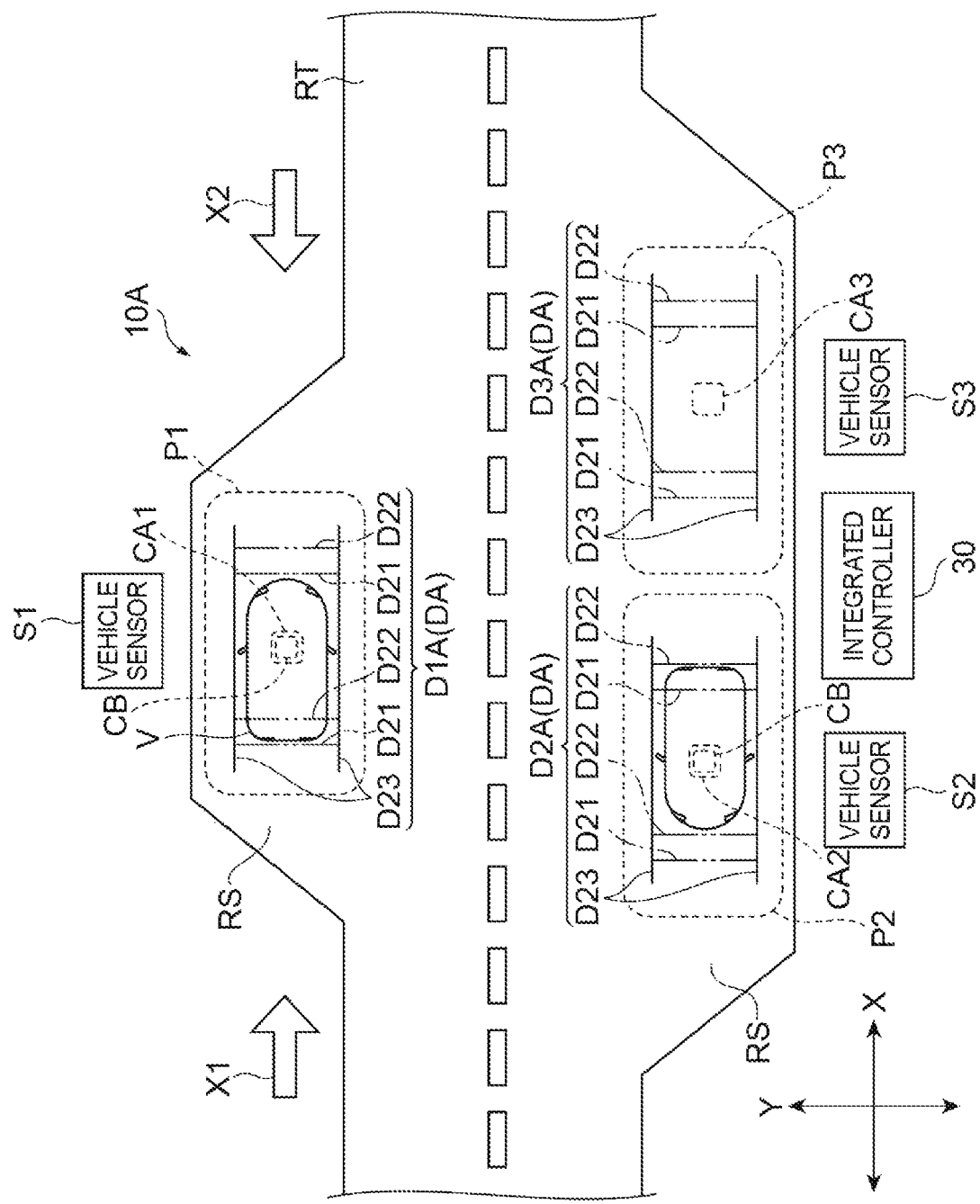
FIG. 9 is a plan view illustrating a modification example of a display unit of the ground-side power transmitter.

In Modification Example 1 illustrated in FIG. 9, a case will be exemplified in which the power receiving coil unit CB of the vehicle V is mounted on the vehicle V on the center line CL2 in the left-right direction Y (refer to FIG. 2B) when viewed from above. In this example, the power supply position of the vehicle V in the left-right direction Y is the same position between a case where the entrance direction of the vehicle V with respect to the power supply space P is the first direction X1 and a case where the entrance direction of the vehicle V with respect to the power supply space P is the second direction X2. As illustrated in FIG. 9, a ground-side power transmitter 10A according to Modification Example 1 includes a display unit D1A, a display unit D2A, and a display unit D3A, instead of the display unit D1, the display unit D2, and the display unit D3. Hereinafter, each of the display unit D1A, the display unit D2A, and the display unit D3A will be referred to as a display unit DA. The display unit DA includes a first display device D21, a second display device D22, and a third display device D23.

As with the first display device D11 and the second display device D12 of the embodiment described above, the first display device D21 and the second display device D22 are a light emitting unit configured of one or a plurality of LEDs installed on the road surface RS of the power supply space P. On the other hand, the third display device D23 is not the light emitting unit such as LED, but for example, a stop line such as a white line drawn on the road surface RS. When the vehicle V that enters the power supply space P in the first direction X1 or the second direction X2 reaches the power supply position, the third display device D23 is depicted on the road surface RS of the power supply space P as a pair of lines extending in the front-back direction X with the vehicle V interposed therebetween in the left-right direction Y when viewed from above. The length of the third display device D23 in the front-back direction X, for example, is the same as the length of the vehicle V in the front-back direction X or is greater than the length of the vehicle V in the front-back direction X.

When the vehicle V that enters the power supply space P in the first direction X1 reaches the first power supply position, the first display device D21 is installed on the road surface RS of the power supply space P as a pair of lines extending in the left-right direction Y with the vehicle V interposed therebetween in the front-back direction X when viewed from above. The interval of the first display device D21 in the front-back direction X, for example, is the same as or slightly greater than the length of the vehicle V in the front-back direction X. The first display device D21 may be installed in a position overlapping with the vehicle V that enters the power supply space P in the first direction X1, or may be installed in a position slightly separated from the vehicle V not to overlap with the vehicle V, when viewed from above. When the vehicle V that enters the power supply space P in the second direction X2 reaches the second power supply position, the second display device D22 is installed on the road surface RS of the power supply space P as a pair of lines extending in the left-right direction Y with the vehicle V interposed therebetween in the front-back direction X when viewed from above. The interval of the second display device D22 in the front-back direction X, for example, is the same as or slightly greater than the length of the vehicle V in the front-back direction X. The second display device D22 may be installed in a position overlapping with the vehicle V that enters the power supply space P in the second direction X2, or may be installed in a position slightly separated from the vehicle V not to overlap with the vehicle V, when viewed from above. The first display device D21 and the second display device D22 extend in the left-right direction Y inside the pair of lines of the third display device D23 to be connected to the pair of lines. The "position slightly separated from the vehicle V" indicates a range in which the vehicle V is capable of stopping sufficiently close to the power supply position to the extent that wireless power supplying to the power receiving coil unit CB from the power transmission coil unit CA is efficiently performed when the vehicle V enters or stops at the power supply space P with the display device (that is, the first display device D21 or the second display device D22) as a mark.

Figure 10A:
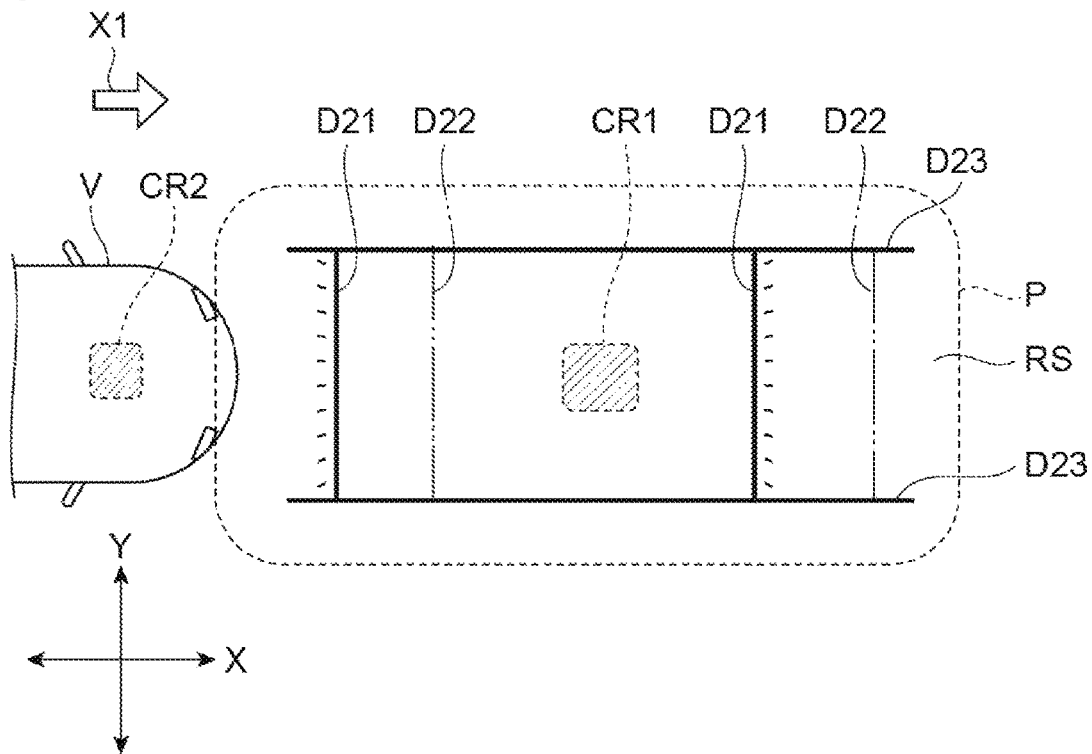
FIG. 10A is a plan view illustrating a state when the vehicle enters the power supply space in which the ground-side power transmitter illustrated in FIG. 9 is installed in the first direction.

In FIG. 10A, the first display device D21 emits light, thereby indicating the first power supply position in the front-back direction X of the vehicle V that enters the power supply space P in the first direction X1. The driver of the vehicle V recognizes the first display device D21 in the light-on state, thereby grasping the first power supply position in the front-back direction X that is indicated by the first display device D21 and recognizing the third display device D23 drawn on the road surface RS. Accordingly, the vehicle V grasps the first power supply position in the left-right direction Y that is indicated by the third display device D23. At this time, the second display device D22 is in the light-off state. The vehicle V is stopped by the driver inside a frame surrounded by the third display device D23 and the first display device D21 by aiming for the third display device D23 and the first display device D21 in the light-on state. Accordingly, the driver of the vehicle V is capable of reaching the first power supply position.

Accordingly, it can be said that the third display device D23 and the first display device D21 in the light-on state are in a state of displaying the first mark indicating the first power supply position of the vehicle V that enters the power supply space P in the first direction X1. The driver of the vehicle V is capable of constantly recognizing the third display device D23 such as a white line. Accordingly, it can be said that the third display device D23 is in a state of constantly indicating the first power supply position in the left-right direction Y of the vehicle V that enters the power supply space P in the first direction X1. On the contrary, in a case where the first display device D21 is in the light-off state, the driver of the vehicle V is not capable of grasping the first power supply position in the front-back direction X even when the third display device D23 indicates the first power supply position in the left-right direction Y. Accordingly, it can be said that the third display device D23 and the first display device D21 in the light-off state are in a state of hiding the first mark indicating the first power supply position of the vehicle V that enters the power supply space P in the first direction X1. For example, the third display device D23 and the first display device D21 may be recognized by a camera.

Figure 10B:
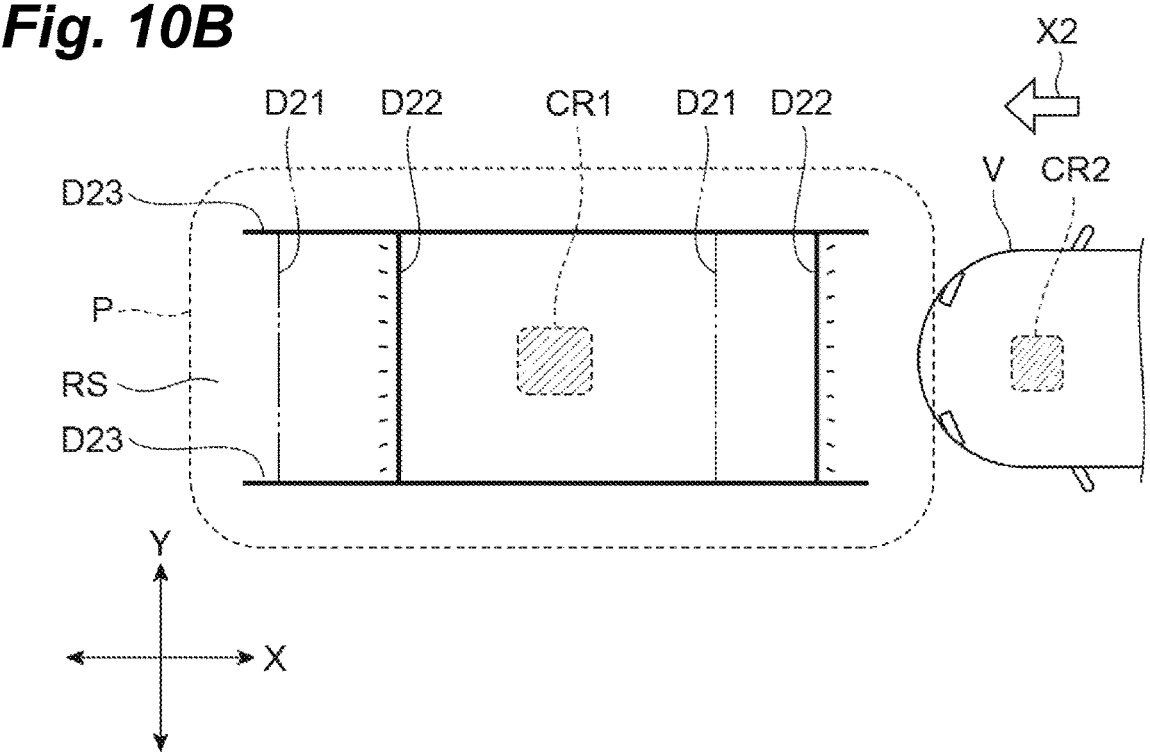
FIG. 10B is a plan view illustrating a state when the vehicle enters the power supply space in which the ground-side power transmitter illustrated in FIG. 9 is installed in the second direction.

In FIG. 10B, the second display device D22 emits light, thereby indicating the second power supply position in the front-back direction X of the vehicle V that enters the power supply space P in the second direction X2. The driver of the vehicle V recognizes the second display device D22 in the light-on state, thereby grasping the second power supply position in the front-back direction X that is indicated by the second display device D22 and recognizing the third display device D23 drawn on the road surface RS. Accordingly, the driver of the vehicle V grasps the second power supply position in the left-right direction Y that is indicated by the third display device D23. At this time, the first display device D21 is in the light-off state. The vehicle V is stopped by the driver inside a frame surrounded by the third display device D23 and the second display device D22 by aiming for the third display device D23 and the second display device D22 in the light-on state. Accordingly, the driver of the vehicle V is capable of reaching the second power supply position.

Accordingly, it can be said that the third display device D23 and the second display device D22 in the light-on state are in a state of displaying the second mark indicating the second power supply position of the vehicle V that enters the power supply space P in the second direction X2. On the contrary, in a case where the second display device D22 is in the light-off state, the driver of the vehicle V is not capable of grasping the second power supply position in the front-back direction X even when the third display device D23 indicates the second power supply position in the left-right direction Y. Accordingly, it can be said that the third display device D23 and the second display device D22 in the light-off state are in a state of hiding the second mark indicating the second power supply position of the vehicle V that enters power supply space P in the second direction X2. For example, the third display device D23 and the second display device D22 may be recognized by a camera.

Since the power receiving coil unit CB is mounted by being misaligned from the center line CL1 of the vehicle V in the front-back direction X (refer to FIG. 2B) when viewed from above, the second power supply position in the front-back direction X of the vehicle V that enters the power supply space P in the second direction X2 is a position misaligned from the first power supply position in the front-back direction X of the vehicle V that enters the power supply space P in the first direction X1. According to this, the second display device D22 is also installed in a position misaligned from the first display device D21 in the front-back direction X. On the other hand, as described above, the power supply position of the vehicle V in the left-right direction Y is not changed between a case where the entrance direction of the vehicle V is the first direction X1 and a case where the entrance direction of the vehicle V is the second direction X2. For this reason, the third display device D23 constantly indicates the power supply position in the left-right direction Y in the same position.

Even in such an aspect, since the vehicle V is capable of entering the power supply space P from either of the first direction X1 and the second direction X2 and receiving power in the power supply position, the same effects as those in the embodiment described above can be obtained. In the example illustrated in FIG. 9, a case is illustrated in which the third display device D23 is a stop line such as a white line. However, the third display device D23 may be a block embedded in the road surface RS, or may be the same light emitting unit as the first display device D21 and the second display device D22. In a case where the third display device D23 is the light emitting unit, by setting the third display device D23 to be in the light-on state or the light-off state, for example, at the same timing as that of the first display device D21, it is possible to display or hide the first mark indicating the first power supply position of the vehicle V that enters the power supply space P in the first direction X1. By setting the third display device D23 to be in the light-on state or the light-off state, for example, at the same timing as that of the second display device D22, it is possible to display or hide the second mark indicating the second power supply position of the vehicle V that enters the power supply space P in the second direction X2. In such a case, the third display device D23 may emit light in the same color as that of the first display device D21 and the second display device D22, or may emit light in a color different from that of the first display device D21 and the second display device D22.

Modification Example 2

Figure 11:
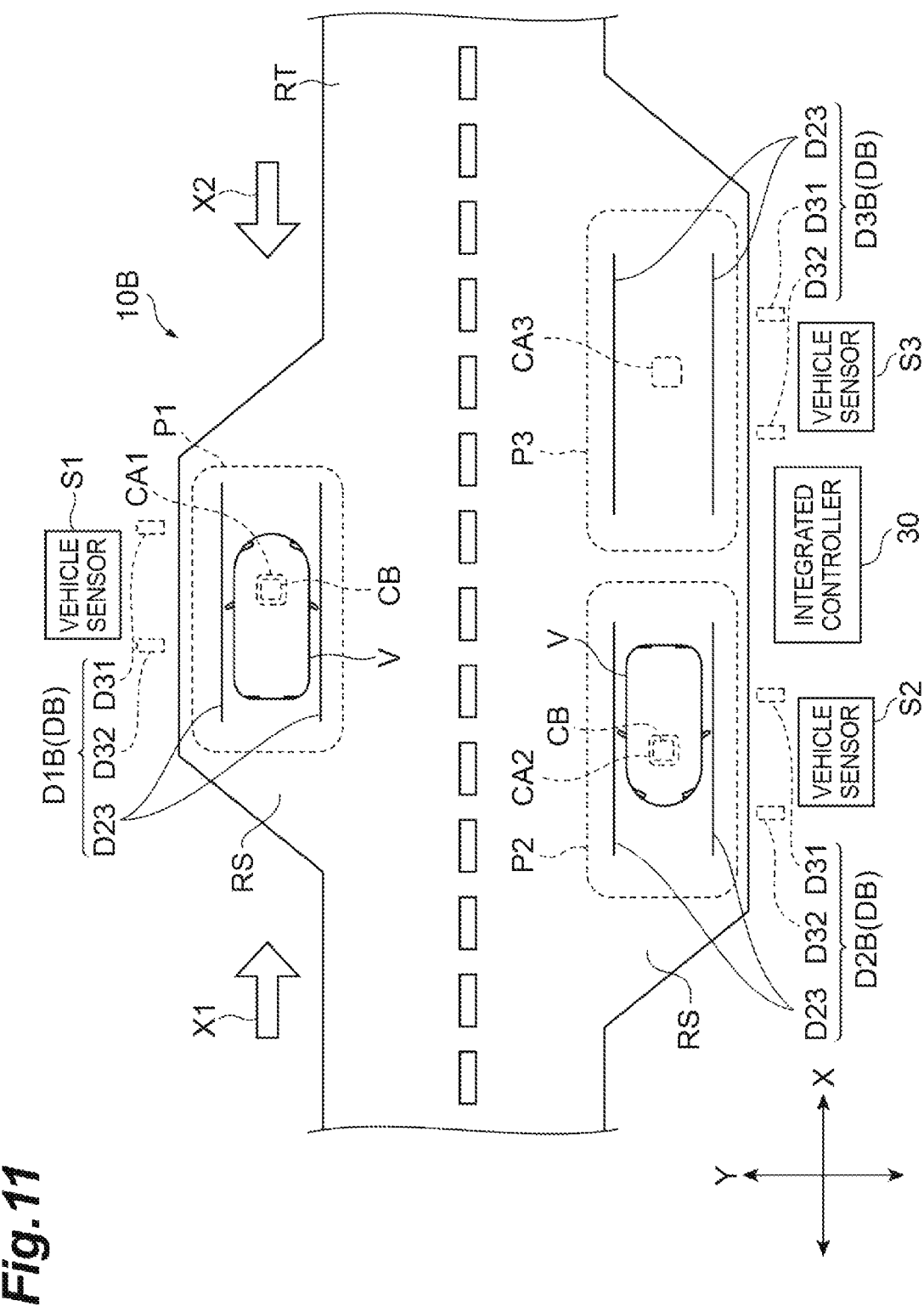
FIG. 11 is a plan view illustrating another modification example of the display unit of the ground-side power transmitter.

As with Modification Example 1 illustrated in FIG. 9, in Modification Example 2 illustrated in FIG. 11, a case will be exemplified in which the power receiving coil unit CB of the vehicle V is mounted on the vehicle V on the center line CL2 in the left-right direction Y (refer to FIG. 2B) when viewed from above. As illustrated in FIG. 11, a ground-side power transmitter 10B according to Modification Example 2 includes a display unit D1B, a display unit D2B, and a display unit D3B, instead of the display unit D1, the display unit D2, and the display unit D3. Hereinafter, each of the display unit D1B, the display unit D2B, and the display unit D3B will be referred to as a display unit DB. The display unit DB includes a first display device D31, a second display device D32, and the third display device D23. The display unit DB is different from the display unit DA illustrated in FIG. 9 in that the first display device D31 and the second display device D32 are provided instead of the first display device D21 and the second display device D22.

The first display device D31 and the second display device D32 are provided in a columnar post installed to be erected on the road surface RS outside the power supply space P. A post in which the first display device D31 is provided and a post in which the second display device D32 is provided are installed in positions separated from each other in the front-back direction X outside the power supply space P. The first display device D31 and the second display device D32, for example, are a light emitting unit configured of one or a plurality of LEDs, and are arranged on the upper end of the post. The first display device D31 is installed in a position indicating a front stop position at which the vehicle V that enters the power supply space P in the first direction X1 needs to stop. That is, the first display device D31 is installed in a position corresponding to the front stop position of the vehicle V that enters the power supply space P in the first direction X1 (specifically, a position facing the front stop position of the vehicle V at a predetermined distance in the left-right direction Y). The first display device D31 may be installed in a position overlapping with the front end (for example, the front end of the front portion) of the vehicle V that enters the power supply space P in the first direction X1 in order for power supply when viewed from the left-right direction Y, or may be installed in a position slightly separated from the front end of the vehicle V.

The second display device D32 installed in a position indicating a front stop position at which the vehicle V that enters the power supply space P in the second direction X2 needs to stop. That is, the second display device D32 is installed in a position corresponding to the front stop position of the vehicle V that enters the power supply space P in the second direction X2 (specifically, a position facing the front stop position of the vehicle V at a predetermined distance in the left-right direction Y). The second display device D32 may be installed in a position overlapping with the front end of the vehicle V that enters the power supply space P in the second direction X2 in order for power supply when viewed from the left-right direction Y, or may be installed in a position slightly separated from the front end of the vehicle V. As with Modification Example 1 illustrated in FIG. 9, the third display device D23 is a stop line such as a white line drawn on the road surface RS of the power supply space P.

Figure 12A:
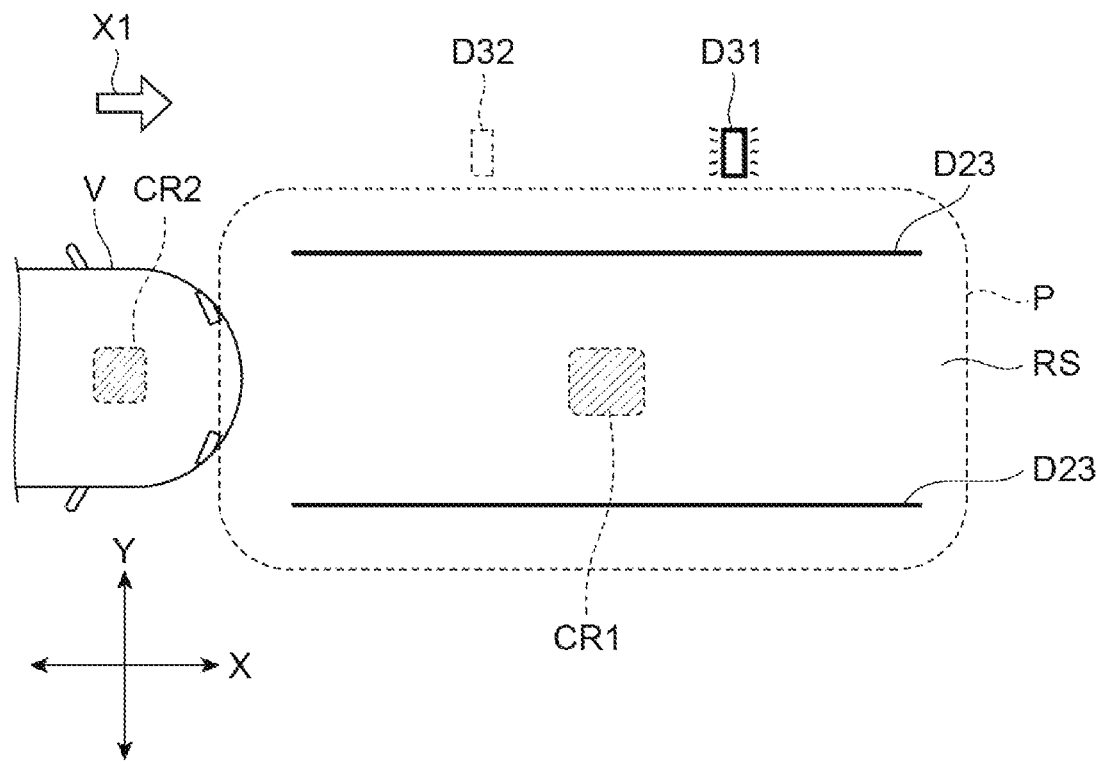
FIG. 12A is a plan view illustrating a state when the vehicle enters the power supply space in which the ground-side power transmitter illustrated in FIG. 11 is installed in the first direction.

In FIG. 12A, the first display device D31 emits light, thereby indicating the first power supply position in the front-back direction X of the vehicle V that enters the power supply space P in the first direction X1. The driver of the vehicle V recognizes the first display device D31 in the light-on state, thereby grasping the first power supply position in the front-back direction X that is indicated by the first display device D31 and recognizing the third display device D23 drawn on the road surface RS. Accordingly, the driver of the vehicle V grasps the first power supply position in the left-right direction Y that is indicated by the third display device D23. At this time, the second display device D32 is in the light-off state. The vehicle V is stopped by the driver at a position inside the frame of the third display device D23 and overlapping with the first display device D31 in the light-on state in the left-right direction Y or a position closer than this position by aiming for the third display device D23 and the first display device D31 in the light-on state. Accordingly, the driver of the vehicle V is capable of reaching the first power supply position. Accordingly, it can be said that the third display device D23 and the first display device D31 in the light-on state are in a state of displaying the first mark indicating the first power supply position of the vehicle V that enters the power supply space P in the first direction X1. On the contrary, in a case where the first display device D31 is in the light-off state, the driver of the vehicle V is not capable of grasping the first power supply position in the front-back direction X even when the third display device D23 indicates the first power supply position in the left-right direction Y. Accordingly, it can be said that the third display device D23 and the first display device D31 in the light-off state are in a state of hiding the first mark indicating the first power supply position of the vehicle V that enters the power supply space P in the first direction X1. For example, the third display device D23 and the first display device D31 may be recognized by a camera.

Figure 12B:
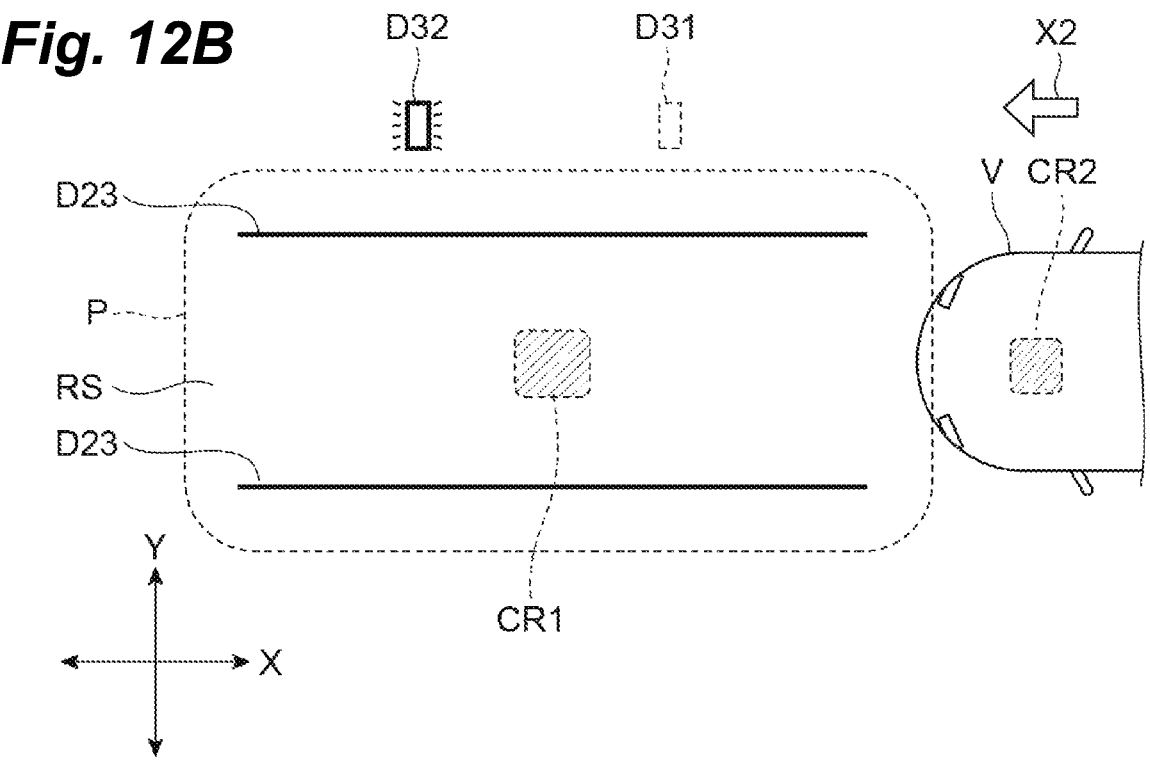
FIG. 12B is a plan view illustrating a state when the vehicle enters the power supply space in which the ground-side power transmitter illustrated in FIG. 11 is installed in the second direction.

In FIG. 12B, the second display device D32 emits light, thereby indicating the second power supply position in the front-back direction X of the vehicle V that enters the power supply space P in the second direction X2. The driver of the vehicle V recognizes the second display device D32 in the light-on state, thereby grasping the second power supply position in the front-back direction X that is indicated by the second display device D32 and recognizing the third display device D23 drawn on the road surface RS. Accordingly, the driver of the vehicle V grasps the second power supply position in the left-right direction Y that is indicated by the third display device D23. At this time, the first display device D31 is in the light-off state. The vehicle V is stopped by the driver at a position inside the frame of the third display device D23 and overlapping with the second display device D32 in the light-on state in the left-right direction Y or a position closer than this position by aiming for the third display device D23 and the second display device D32 in the light-on state. Accordingly, the driver of the vehicle V is capable of reaching the second power supply position. Accordingly, it can be said that the third display device D23 and the second display device D32 in the light-on state are in a state of displaying the second mark indicating the second power supply position of the vehicle V that enters the power supply space P in the second direction X2. On the contrary, in a case where the second display device D32 is in the light-off state, the driver of the vehicle V is not capable of grasping the second power supply position in the front-back direction X even when the third display device D23 indicates the second power supply position in the left-right direction Y. Accordingly, it can be said that the third display device D23 and the second display device D32 in the light-off state are in a state of hiding the second mark indicating the second power supply position of the vehicle V that enters the power supply space P in the second direction X2. For example, the third display device D23 and the second display device D32 may be recognized by a camera. Even in such an aspect, since the vehicle V is capable of entering the power supply space P from either of the first direction X1 and the second direction X2 and receiving power in the power supply position, the same effects as those in the embodiment described above can be obtained. The first display device D31 may be installed on the road surface RS. For example, in FIG. 10A of Modification Example 1 described above, in the pair of lines indicating the first display device D21, only the line on a side away from the vehicle V that enters the power supply space P in the first direction X1 may function as the first display device D31, and the line on a side close to the vehicle V may not be provided. The second display device D32 may be installed on the road surface RS. For example, in FIG. 10B of Modification Example 1, in the pair of lines indicating the second display device D22, only the line on a side away from the vehicle V that enters the power supply space P in the second direction X2 may function as the second display device D32, and the line on a side close to the vehicle V may not be provided.

Modification Example 3

Figure 13:
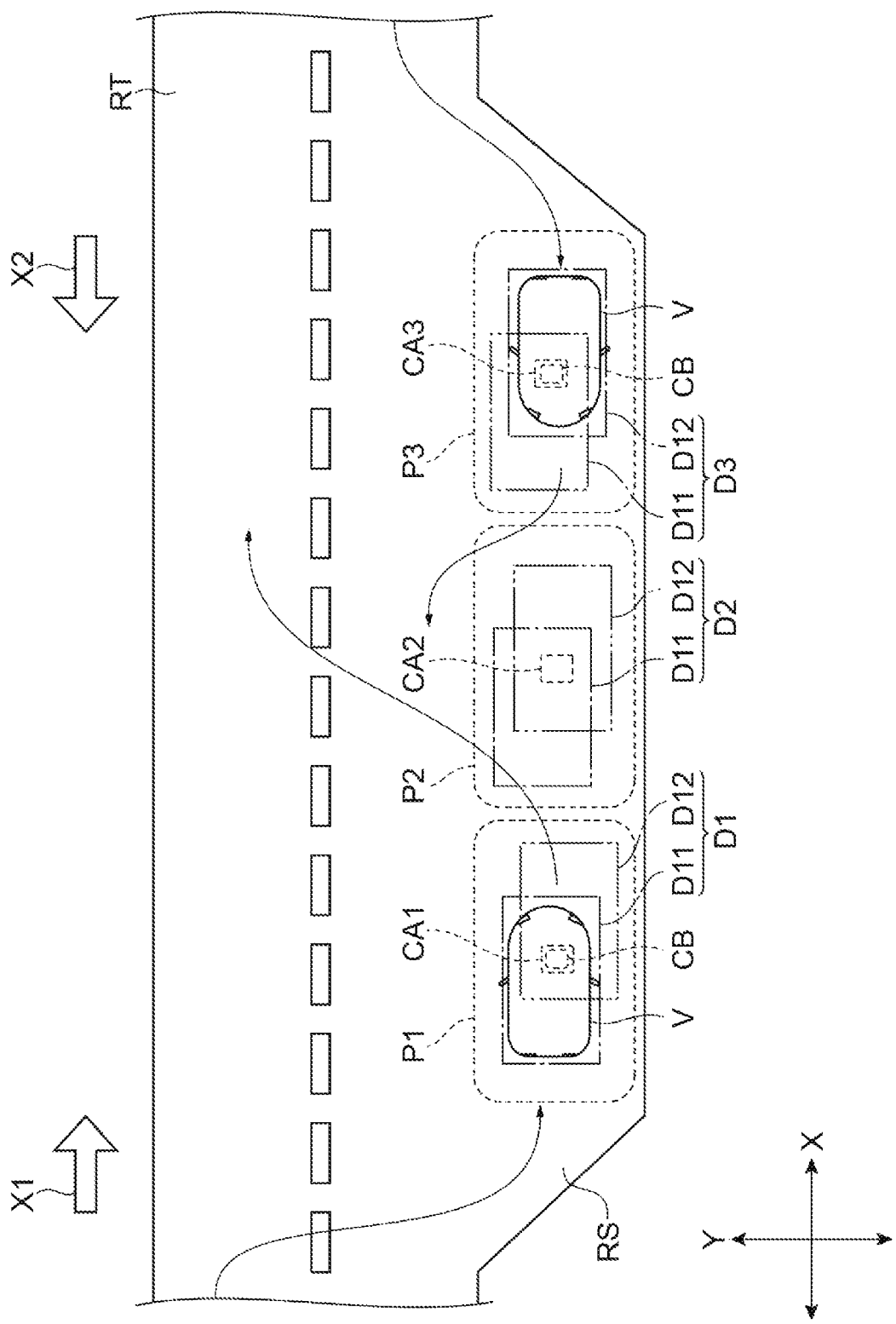
FIG. 13 is a plan view illustrating a modification example of an installation site of the power supply space.

In Modification Example 3 illustrated in FIG. 13, an installation site of the power supply space P is different from that in the embodiment described above. As illustrated in FIG. 13, three power supply spaces P1, P2, and P3 may be provided only on one side of the traveling road RT in the left-right direction Y. Three power supply spaces P1, P2, and P3 may be arranged in parallel along the front-back direction X on the road surface RS on one side of the traveling road RT. Such an aspect is effective in a case where it is not possible to ensure a space for providing the power supply space P on both sides of the traveling road RT in the left-right direction Y. In such an aspect, since the vehicle V that travels on the traveling road RT is also capable of entering the power supply space P from either of the first direction X1 and the second direction X2, the same effects as those in the embodiment described above can be obtained.

Modification Example 4

Figure 14:
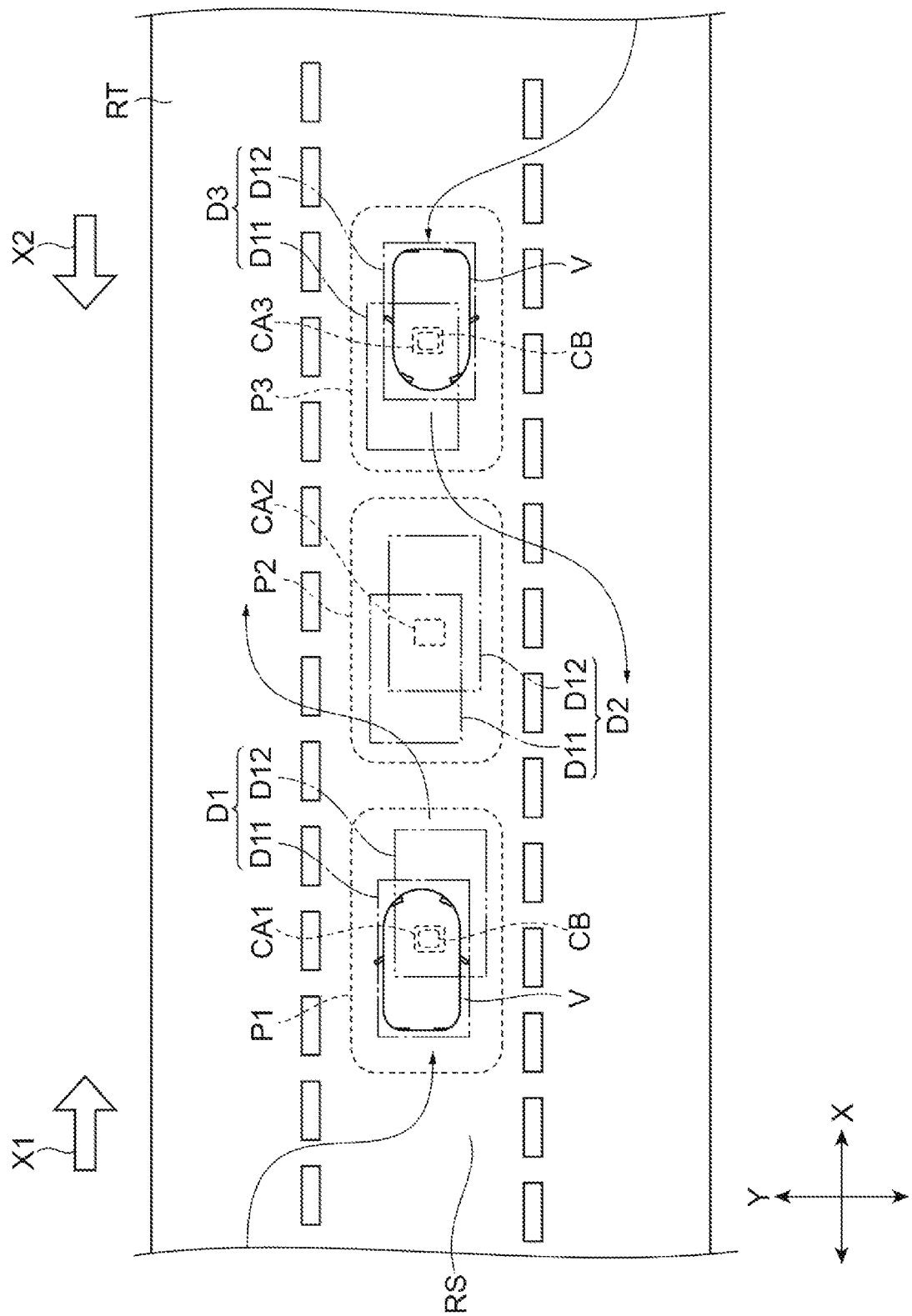
FIG. 14 is a plan view illustrating another modification example of the installation site of the power supply space.

Modification Example 4 illustrated in FIG. 14 is another modification example of Modification Example 3 illustrated in FIG. 13. As illustrated in FIG. 14, three power supply spaces P1, P2, and P3 may be provided inside the traveling road RT. In an example illustrated in FIG. 14, the traveling road RT is a three-traffic lane road, and three power supply spaces P1, P2, and P3 may be arranged in parallel along the front-back direction X on the road surface RS of the middle traffic lane among the three traffic lanes. That is, three power supply spaces P1, P2, and P3 are arranged in a position interposed between a traffic lane with the first direction X1 as the travel direction and a traffic lane with the second direction X2 as the travel direction. Such an aspect is also effective in a case where it is not possible to ensure a space for providing the power supply space P on both sides of the traveling road RT in the left-right direction Y. In such an aspect, since it is assumed that the vehicle V that travels on the traveling road RT enters the power supply space P from either of the first direction X1 and the second direction X2, the same effects as those in the embodiment described above can be obtained.

Modification Example 5

Figure 15A:
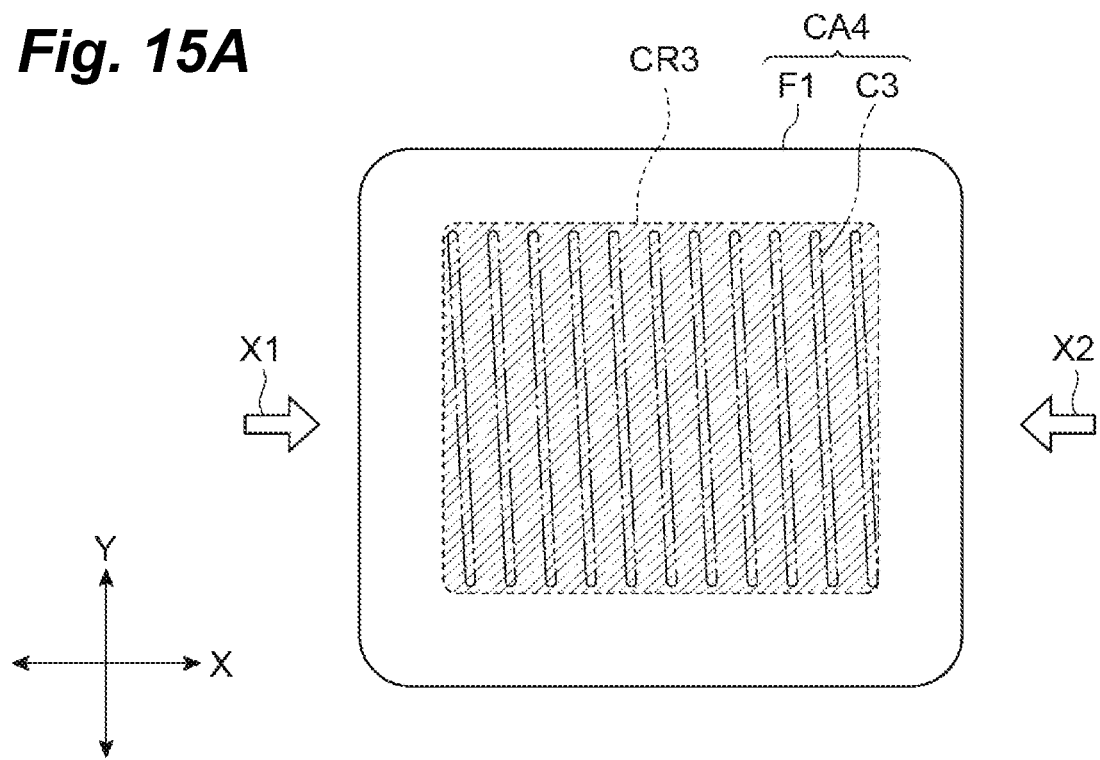
FIG. 15A is a plan view illustrating a modification example of the power transmission coil unit.
Figure 15B:
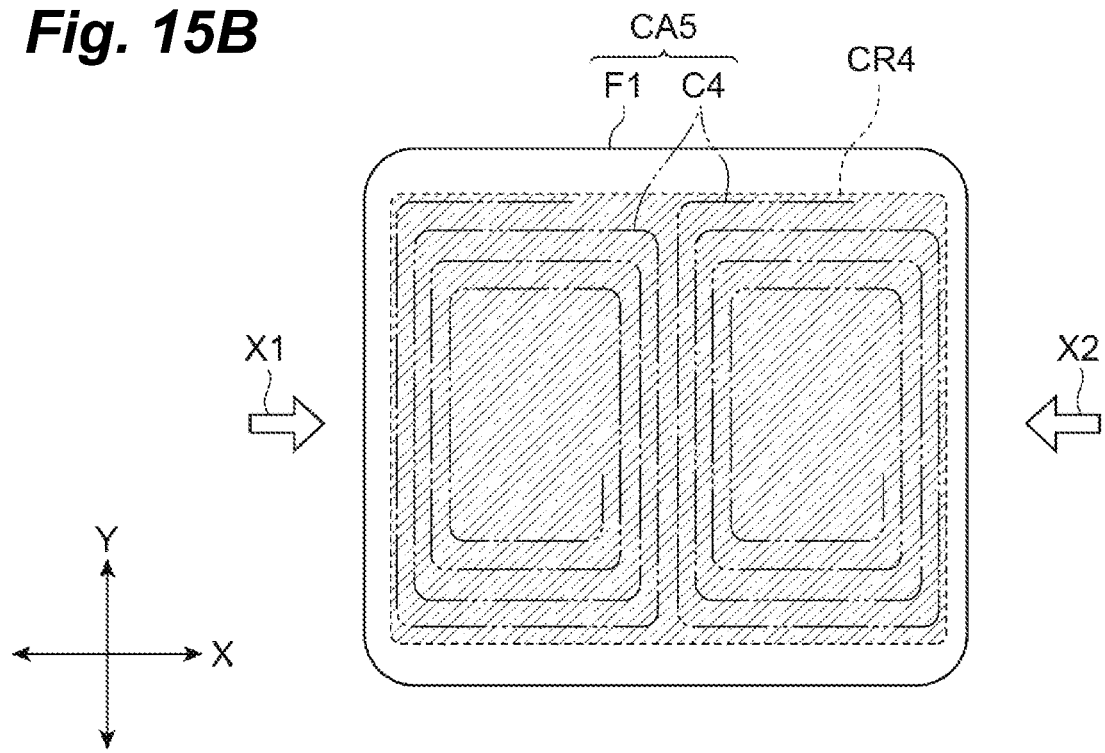
FIG. 15B is a plan view illustrating another modification example of the power transmission coil unit.

In Modification Example 5 illustrated in FIGS. 15A and 15B, the type of power transmission coil of the power transmission coil unit is different from that in the embodiment described above. As illustrated in FIG. 15A, a power transmission coil C3 of a power transmission coil unit CA4 may be a solenoid coil. In such a case, a power transmission coil region CR3 in the power transmission coil unit CA4 in which the power transmission coil C3 is provided has a rectangular shape including the power transmission coil C3. As illustrated in FIG. 15A, even in a case where the power transmission coil region CR3 has the rectangular shape, for example, four corners of the rectangular shape may be rounded to follow a circular shape indicating the sectional surface of the conductive wire of the power transmission coil C3. The power receiving coil of the power receiving coil unit may also be a solenoid coil. In such a case, the power receiving coil region in the power receiving coil unit in which the power receiving coil is provided may also have the same rectangular shape as that of the power transmission coil region CR3, or may have a shape different from that of the power transmission coil region CR3.

Figure 16A:
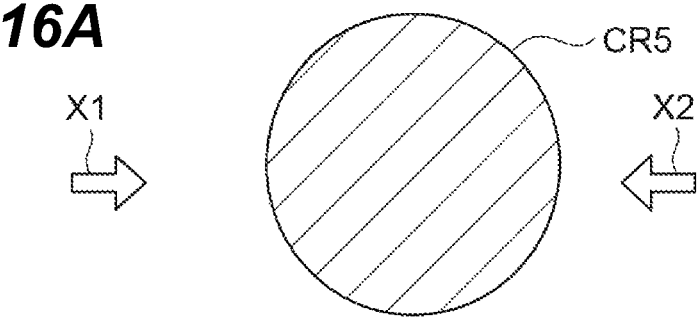
FIGS. 16A, 16B, 16C, and 16D are plan views illustrating modification examples of the shape of a power transmission coil region.
Figure 16B:
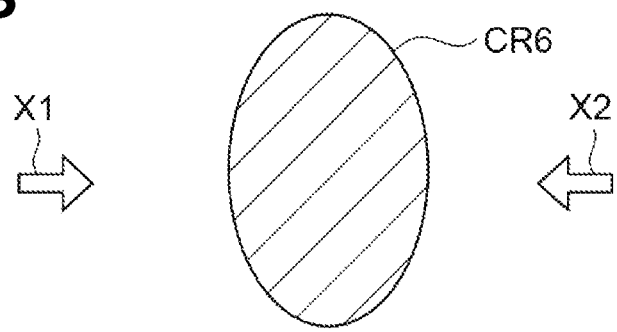
Figure 16C:
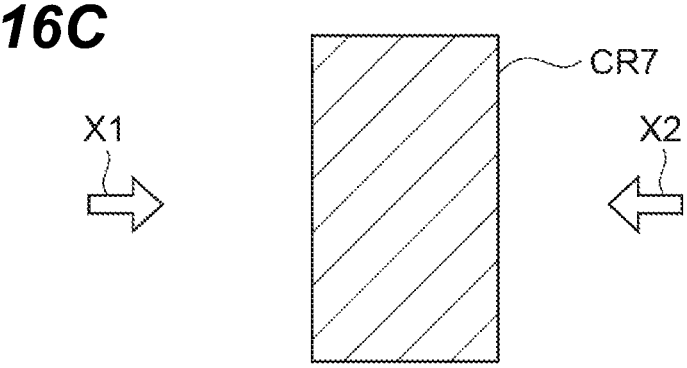
Figure 16D:
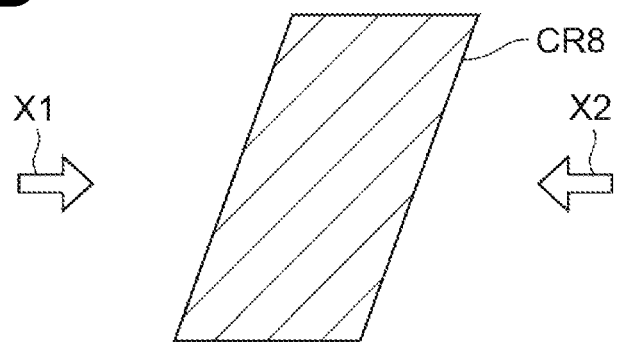

As illustrated in FIG. 15B, a power transmission coil unit CA5 may have a configuration in which two circular power transmission coils C4 are arranged adjacent to each other in the front-back direction X. In such a case, a power transmission coil region CR4 in the power transmission coil unit CA5 in which two power transmission coils C4 are provided has a rectangular shape including two power transmission coils C4. As illustrated in FIG. 15B, even in a case where the power transmission coil region CR4 has the rectangular shape, four corners of the rectangular shape may be also rounded. The power receiving coil of the power receiving coil unit may also have the same configuration as that of the power transmission coil C4. In such a case, the power receiving coil region in the power receiving coil unit in which the power receiving coil is provided may also have the same rectangular shape as that of the power transmission coil region CR4, or may have a shape different from that of the power transmission coil region CR4. The power transmission coil region may be a circular power transmission coil region CR5 illustrated in FIG. 16A. The power transmission coil region may be an elliptical (oval) power transmission coil region CR6 illustrated in FIG. 16B. The power transmission coil region may be a rectangular power transmission coil region CR7 illustrated in FIG. 16C. The power transmission coil region may be a parallelogram power transmission coil region CR8 illustrated in FIG. 16D. The power receiving coil region may also have the same shapes as those of the power transmission coil regions.

Other Modification Examples

In the embodiment and each of the modification examples described above, a case has been exemplified in which the "movable object" is the vehicle V. However, the "movable object" may be a ground-based movable object other than the vehicle V. Alternatively, the "movable object" may be a water movable object such as a ship, or may be an underwater movable object such as a submarine. In the embodiment and each of the modification examples described above, a case has been exemplified in which the "power supply space" is provided on the side of the traveling road. However, the "power supply space" may be a parking lot in which a vehicle is parked, or may be a standby place in which a taxi or the like stands by. For example, in a case where the "movable object" is a ship that is used on a canal, the "power supply space" may be provided in the middle of the canal. In a case where the ship travels on a narrow canal, it is not possible to change the direction in the middle of the course. Therefore, since the ship is capable of receiving power in the "power supply space" by providing the "power supply space" that the ship is capable of entering from either of the both directions in the middle of the course, regardless a travel direction of the ship, the effects of the embodiment and each of the modification examples described above can be preferably obtained.

In the embodiment and each of the modification examples described above, a case has been described in which the power receiving coil unit CB is arranged in the position misaligned from the center CP of the vehicle V when viewed from above. However, the power receiving coil unit can also be arranged on the center of the vehicle. In such a case, since the second power supply position of the vehicle when entering the power supply space in the second direction is the same position as the first power supply position of the vehicle when entering the power supply space in the first direction, the second display unit can also be installed in the same position as that of the first display unit. In each of a case where the vehicle enters the power supply space in the first direction and a case where the vehicle enters the power supply space in the second direction, both of the first display unit and the second display unit may be in the light-on state. In such a case, it is possible to display the first mark and the second mark in colors different from each other by the first display unit and the second display unit, for example, emitting light in colors different from each other.

In the embodiment and each of the modification examples described above, a case has been described in which the power transmission coil region CR1 has the area larger than that of the power receiving coil region CR2. However, there can also be a case where the power receiving coil region has an area larger than that of the power transmission coil region. In such a case, insofar as the power receiving coil unit is arranged such that the power transmission coil region falls inside the power receiving coil region when viewed from above in a case of the power supply of the vehicle that enters the power supply space in the first direction, the power receiving coil unit can similarly be arranged such that the power transmission coil region falls inside the power receiving coil region in a case of the power supply of the vehicle that enters the power supply space in the second direction. In such a case, since the non-overlapping region with the power receiving coil region does not occur in the power transmission coil region, the magnetic flux generated from the power transmission coil region is capable of efficiently reaching the power receiving coil region without leaking. As a result thereof, even in a case where the entrance direction of the vehicle is the first direction or the second direction, desired transmission performance can be obtained. There can also be a case where the power receiving coil region has the same area as that of the power transmission coil region. In such a case, even in a case where the entrance direction of the vehicle is the first direction or the second direction, the power receiving coil unit can be arranged such that the power transmission coil region and the power receiving coil region overlap with each other when viewed from above. Even in such a case, since it is possible to allow the magnetic flux generated from the power transmission coil region to efficiently reach the power receiving coil region, even in a case where the entrance direction of the vehicle is the first direction or the second direction, desired transmission performance can be obtained.

REFERENCE SIGNS LIST

2: power supply system, 10, 10A, 10B: ground-side power transmitter (power supply device), 32a: information processor, 32b: display controller, C1, C3, C4: power transmission coil, C2: power receiving coil, CA, CAL CA2, CA3, CA4, CA5: power transmission coil unit, CB: power receiving coil unit, CP1, CP2: center, CR1, CR3, CR4, CR5, CR6, CR7, CR8: power transmission coil region, CR2: power receiving coil region, D, D1, D1A, D1B, D2, D2A, D2B, D3, D3A, D3B, DA, DB: display unit, D11, D21, D31: first display device, D12, D22, D32: second display device, P, P1, P2, P3: power supply space, RS: road surface (installation surface), RT: traveling road, V: vehicle, X1: first direction, X2: second direction.

The invention claimed is:

1. A power supply device comprising:
a power transmission coil unit installed in a power supply space and capable of wirelessly transmitting electric power with respect to a power receiving coil unit mounted on a movable object existing in the power supply space, the movable object being capable of entering the power supply space; and
a display unit installed around the power transmission coil unit and displaying a mark indicating a power supply position of the movable object when the power transmission coil unit transmits power to the power receiving coil unit,
wherein when viewed from a normal direction of an installation surface of the power supply space on which the power transmission coil unit is installed, a power transmission coil region in which a power transmission coil is provided in the power transmission coil unit has a point-symmetric shape with respect to a center of the power transmission coil region, and
wherein the display unit includes
a first display device displaying a first mark indicating a first power supply position of the movable object in the power supply space when the movable object enters the power supply space in a first direction along an in-plane direction of the installation surface, and
a second display device displaying a second mark indicating a second power supply position of the movable object in the power supply space when the movable object enters the power supply space in a second direction opposite to the first direction.

2. The power supply device according to claim 1,
wherein the second display device is installed in a position different from that of the first display device.

3. The power supply device according to claim 1,
wherein the second display device displays the second mark in a color different from that of the first mark.

4. The power supply device according to claim 1, further comprising
a display controller controlling the display unit,
wherein the display controller
performs first control of allowing the first display device to display the first mark and the second display device to hide the second mark when the movable object enters the power supply space in the first direction, and
performs second control of allowing the second display device to display the second mark and the first display device to hide the first mark when the movable object enters the power supply space in the second direction.

5. The power supply device according to claim 4, further comprising
an information processor receiving an entrance request including entrance direction information indicating an entrance direction of the movable object with respect to the power supply space from the movable object,
wherein the display controller
performs the first control when the entrance direction information indicates the first direction, and
performs the second control when the entrance direction information indicates the second direction.

6. The power supply device according to claim 1,
wherein the movable object is a vehicle capable of traveling on a traveling road,
the traveling road extends in a direction along the first direction and the second direction as an extending direction, and
the power supply space is provided in a position adjacent to the traveling road in a direction intersecting the extending direction.

7. A power supply system, comprising:
the power supply device according to claim 1; and
the power receiving coil unit mounted on the movable object.

8. The power supply system according to claim 7,
wherein when viewed from the normal direction, a power receiving coil region in which a power receiving coil is provided in the power receiving coil unit has a point-symmetric shape with respect to a center of the power receiving coil region.

* * * * *